(12) United States Patent
Ekseth et al.

(10) Patent No.: US 8,433,519 B2
(45) Date of Patent: Apr. 30, 2013

(54) DOWNHOLE SURVEYING UTILIZING MULTIPLE MEASUREMENTS

(75) Inventors: Roger Ekseth, Sjetnemarka (NO); John Lionel Weston, Dorset (GB)

(73) Assignee: Gyrodata, Incorporated, Houston, TX (US)

( * ) Notice: Subject to any disclaimer, the term of this patent is extended or adjusted under 35 U.S.C. 154(b) by 0 days.

(21) Appl. No.: 13/308,267

(22) Filed: Nov. 30, 2011

(65) Prior Publication Data
US 2012/0126817 A1    May 24, 2012

Related U.S. Application Data

(63) Continuation of application No. 12/256,410, filed on Oct. 22, 2008, now Pat. No. 8,095,317.

(51) Int. Cl.
G01V 1/40  (2006.01)
(52) U.S. Cl.
USPC .............................................. 702/7
(58) Field of Classification Search ....... 702/7, 182–185
See application file for complete search history.

(56) References Cited

U.S. PATENT DOCUMENTS

| | | | |
|---|---|---|---|
| 1,599,538 | A | 9/1926 | Mintrop |
| 3,143,892 | A | 8/1964 | Chapman |
| 3,490,149 | A | 1/1970 | Bowers |
| 3,741,500 | A | 6/1973 | Liden |
| 4,199,869 | A | 4/1980 | Van Steenwyk |
| 4,293,046 | A | 10/1981 | Van Steenwyk |
| 4,297,790 | A | 11/1981 | Van Steenwyk et al. |
| 4,433,491 | A | 2/1984 | Ott et al. |
| 4,461,088 | A | 7/1984 | Van Steenwyk |
| 4,471,533 | A | 9/1984 | Van Steenwyk |
| 4,522,062 | A | 6/1985 | Peters |
| 4,537,067 | A | 8/1985 | Sharp et al. |
| 4,545,242 | A | 10/1985 | Chan |
| 4,593,559 | A | 6/1986 | Brown et al. |

(Continued)

FOREIGN PATENT DOCUMENTS

| | | |
|---|---|---|
| EP | 0 497 420 | 8/1992 |
| EP | 0 646 696 | 9/1994 |

(Continued)

OTHER PUBLICATIONS

US 6,151,553, 11/2000, Estes et al. (withdrawn).

(Continued)

*Primary Examiner* — Edward Raymond
(74) *Attorney, Agent, or Firm* — Knobbe, Martens, Olson & Bear, LLP

(57) ABSTRACT

Certain embodiments described herein provide a measure of the misalignment of multiple acceleration sensors mounted in the downhole portion of a drill string. In certain embodiments, the measure of the misalignment corresponds to a measure of sag which can be used to provide an improved estimate of the inclination of the downhole portion of the drill string and/or the wellbore. Certain embodiments described herein provide an estimate of the magnetic interference incident upon a drilling system using multiple magnetic sensors mounted within a non-magnetic region of the downhole portion of the drilling system. Certain embodiments utilize the magnetic measurements to determine an axial interference resulting from one or more magnetic portions of the downhole portion and to provide an improved estimate of the azimuthal orientation of the downhole portion with respect to the magnetic field of the Earth.

14 Claims, 8 Drawing Sheets

U.S. PATENT DOCUMENTS

| | | | |
|---|---|---|---|
| 4,611,405 A | 9/1986 | Van Steenwyk |
| 4,821,572 A | 4/1989 | Hulsing |
| 4,909,336 A | 3/1990 | Brown et al. |
| 4,987,684 A | 1/1991 | Andreas et al. |
| 5,099,927 A | 3/1992 | Gibson et al. |
| 5,319,561 A | 6/1994 | Matsuzaki |
| 5,432,699 A | 7/1995 | Hache et al. |
| 5,512,830 A | 4/1996 | Kuckes |
| 5,522,260 A | 6/1996 | Chappellat et al. |
| 5,585,726 A | 12/1996 | Chau |
| 5,606,124 A | 2/1997 | Doyle et al. |
| 5,635,638 A | 6/1997 | Geen et al. |
| 5,635,640 A | 6/1997 | Geen et al. |
| 5,657,547 A | 8/1997 | Uttecht et al. |
| 5,806,195 A | 9/1998 | Uttecht et al. |
| 5,812,068 A | 9/1998 | Wisler et al. |
| 5,821,414 A | 10/1998 | Noy et al. |
| 5,842,149 A | 11/1998 | Harrell et al. |
| 5,869,760 A | 2/1999 | Green |
| 5,912,524 A | 6/1999 | Ohnishi et al. |
| 5,946,094 A | 8/1999 | Sahlgren et al. |
| 6,021,377 A | 2/2000 | Dubinsky et al. |
| 6,023,325 A | 2/2000 | Sahlgren et al. |
| 6,044,706 A | 4/2000 | Roh |
| 6,089,089 A | 7/2000 | Hsu |
| 6,122,961 A | 9/2000 | Geen et al. |
| 6,134,961 A | 10/2000 | Touge et al. |
| 6,145,378 A | 11/2000 | MacRobbie et al. |
| 6,173,773 B1 | 1/2001 | Almaguer et al. |
| 6,173,793 B1 | 1/2001 | Thompson et al. |
| 6,192,748 B1 | 2/2001 | Miller |
| 6,206,108 B1 | 3/2001 | MacDonald et al. |
| 6,257,356 B1 | 7/2001 | Wassell |
| 6,267,185 B1 | 7/2001 | Mougel et al. |
| 6,272,434 B1 | 8/2001 | Wisler et al. |
| 6,281,618 B1 | 8/2001 | Ishitoko et al. |
| 6,315,062 B1 | 11/2001 | Alft et al. |
| 6,347,282 B2 | 2/2002 | Estes et al. |
| 6,360,601 B1 | 3/2002 | Challoner et al. |
| 6,381,858 B1 | 5/2002 | Shirasaka |
| 6,389,187 B1 | 5/2002 | Greenaway et al. |
| 6,431,270 B1 | 8/2002 | Angle |
| 6,453,239 B1 | 9/2002 | Shirasaka et al. |
| 6,484,818 B2 | 11/2002 | Alft et al. |
| 6,529,834 B1 | 3/2003 | Estes et al. |
| 6,655,460 B2 | 12/2003 | Bailey et al. |
| 6,659,201 B2 | 12/2003 | Head et al. |
| 6,714,870 B1 | 3/2004 | Weston et al. |
| 6,837,332 B1 | 1/2005 | Rodney |
| 6,845,665 B2 | 1/2005 | Green |
| 6,848,304 B2 | 2/2005 | Green |
| 6,859,751 B2 | 2/2005 | Cardarelli |
| 6,895,678 B2 | 5/2005 | Ash et al. |
| 6,957,580 B2 | 10/2005 | Ekseth et al. |
| 7,028,409 B2 | 4/2006 | Engebretson et al. |
| 7,117,605 B2 | 10/2006 | Ekseth et al. |
| 7,225,550 B2 | 6/2007 | Ekseth et al. |
| 7,350,410 B2 | 4/2008 | Ekseth et al. |
| 7,584,788 B2 | 9/2009 | Baron et al. |
| 2002/0032529 A1 | 3/2002 | Duhon |
| 2002/0046605 A1 | 4/2002 | Geen et al. |
| 2002/0056201 A1 | 5/2002 | Dallas et al. |
| 2002/0112887 A1 | 8/2002 | Harrison |
| 2003/0034178 A1 | 2/2003 | Cargill et al. |
| 2004/0073369 A1 | 4/2004 | McElhinney |
| 2005/0022404 A1 | 2/2005 | Ash et al. |
| 2005/0109097 A1 | 5/2005 | Bogath et al. |
| 2005/0150689 A1* | 7/2005 | Jogi et al. ................. 175/45 |
| 2005/0183502 A1 | 8/2005 | Rodney |
| 2005/0224257 A1 | 10/2005 | Ekseth et al. |
| 2006/0070770 A1 | 4/2006 | Marsh |
| 2006/0253253 A1 | 11/2006 | Reynolds et al. |
| 2007/0235226 A1 | 10/2007 | Wright et al. |
| 2009/0119937 A1 | 5/2009 | Watson |
| 2010/0100329 A1 | 4/2010 | Ekseth et al. |

FOREIGN PATENT DOCUMENTS

| | | |
|---|---|---|
| EP | 2 045 440 | 4/2009 |
| GB | 2172324 | 9/1986 |
| GB | 2177738 | 1/1987 |
| SU | 901485 | 1/1982 |
| WO | WO 02/103158 | 12/2002 |
| WO | WO 2005/008029 | 1/2005 |
| WO | WO 2005/073509 | 8/2005 |
| WO | WO 2005/100916 | 10/2005 |

OTHER PUBLICATIONS

±150*/s *Single Chip Yaw Rate Gyro with Signal Conditioning*, Analog Devices, ADXRS150, © 2003 Analog Devices, Inc.

±300*/s *Single Chip Yaw Rate Gyro with Signal Conditioning*, Analog Devices, ADXRS300.. © 2004 Analog Devices, Inc.

Geen, J., et al., *New iMEMS® Angular-Rate-Sensing Gyroscope*, Analog Dialogue, 2003, vol. 37, No. 3, pp. 1-4.

International Search Report and Written Opinion for PCT/US2010/021538, mailed Aug. 12, 2010 in 15 pages.

International Search Report and Written Opinion for PCT/US2010/022653, mailed Dec. 8, 2010 in 12 pages.

International Search Report for Application No. PCT/US2004/021899, mailed Dec. 11, 2004 in 2 pages.

"Reflex Maxibor II, Borehole Survey System". Reflex Product Information, Printed from www.reflex.se on Feb. 7, 2007 in 8 pages.

Teegarden, Darrell, et al., *How to Model and Simulate Microgyroscope Systems*, IEEE Spectrum, Jul. 1998, vol. 35, No. 7, pp. 66-75.

Torkildsen, et al., "Prediction of Well Bore Position Accuracy, When Surveyed with Gyroscopic Tools," Industry Steering Committee on Wellbore Survey Accuracy, ISCWSA, dated Jan. 29, 2004 in 63 pages.

Uttecht, G.W., et al., "Survey Accuracy is Improved by a New, Small OD Gyro,"*World Oil*, Mar. 1983.

Yazdi, N., et al., *Micromachined Inertial Sensors*, Proc. of the IEEE, Aug. 1998, vol. 86, No. 8, pp. 1640-1659.

* cited by examiner

DOWNHOLE SURVEYING UTILIZING MULTIPLE MEASUREMENTS

This application is a continuation of U.S. patent application Ser. No. 12/256,410, filed Oct. 22, 2008, the disclosure of which is incorporated in its entirety by reference herein.

BACKGROUND

1. Field of the Invention

The present application relates generally to systems and methods for utilizing measurements from multiple sensors on a drilling tool within a wellbore to correct for measurement errors and/or determine the position of the wellbore in relation to another wellbore.

2. Description of the Related Art

Rotary steerable drilling tools can be equipped with survey instrumentation, such as measurement while drilling (MWD) instrumentation, which provides information regarding the orientation of the survey tool, and hence, the orientation of the well at the tool location. Survey instrumentation can make use of various measured quantities such as one or more of acceleration, magnetic field, and angular rate to determine the orientation of the tool and the associated wellbore with respect to a reference vector such as the Earth's gravitational field, magnetic field, or rotation vector. The determination of such directional information at generally regular intervals along the path of the well can be combined with measurements of well depth to allow the trajectory of the well to be determined. However, measurements used in this process can be subject to errors. For example, the errors may be the result of imperfections internal to the instrumentation itself or external disturbances that can affect the output of the instrumentation and its associated sensors. Internal errors can generally be accounted for using calibration techniques and other methods. However, external errors, such as errors resulting from misalignments of the sensors within the wellbore, or errors caused by disturbances affecting the relevant reference vector (e.g., the Earth's magnetic field) can be more difficult to correct.

In addition, when a wellbore is drilled in an area in which one or more existing wellbores are present it is useful to determine the relative position of the wellbore and downhole portion of the drilling tool in relation to the existing wellbore. For example, this information can be useful to avoid collisions with existing wellbores or to drill a relief well to intercept an existing well. Furthermore, there are situations in which it is useful to drill a well alongside an existing well to implement a process known as steam assisted gravity drainage (SAGD) to facilitate the retrieval of heavy oil deposits in certain parts of the world. In this case, existing methods involve inserting equipment, such as a solenoid, into the existing wellbores. The equipment gives rise to magnetic field disturbances, which can be detected by sensors in the new well and used to determine the position of the drilling tool and wellbore in relation to the existing wellbore. Such techniques can be costly, in part because of the additional equipment involved and because such operations are time consuming.

SUMMARY

In certain embodiments, a drill string is provided which includes a downhole portion adapted to move within a wellbore, the downhole portion having a first portion at a first position within the wellbore and oriented at a first angle relative to the wellbore at the first position and a second portion at a second position within the wellbore and oriented at a second angle relative to the wellbore at the second position, wherein at least one of the first and second angles is non-zero. The drill string of certain embodiments includes a first acceleration sensor mounted within the first portion, the first acceleration sensor adapted to generate a first signal indicative of an acceleration of the first acceleration sensor. The drill string of certain embodiments also includes a second acceleration sensor mounted within the second portion, the second acceleration sensor adapted to generate a second signal indicative of an acceleration of the second acceleration sensor.

In certain embodiments, a method for generating information indicative of misalignment between first and second acceleration sensors mounted within the downhole portion of a drill string is provided. The method of certain embodiments includes providing a drill string comprising. The drill string of certain embodiments includes a downhole portion adapted to move within a wellbore, the downhole portion having a first portion at a first position within the wellbore and oriented at a first angle relative to the wellbore at the first position and a second portion at a second position within the wellbore and oriented at a second angle relative to the wellbore at the second position wherein at least one of the first and second angles is non-zero. The drill string can also include a first acceleration sensor mounted within the first portion, the first acceleration sensor adapted to generate a first signal indicative of an acceleration of the first acceleration sensor and a second acceleration sensor mounted within the second portion, the second acceleration sensor adapted to generate a second signal indicative of an acceleration of the second acceleration sensor. The method of certain embodiments further includes generating the first signal and the second signal while the downhole portion of the drill string is within the wellbore.

In certain embodiments, a method of determining the misalignment between first and second acceleration sensors mounted within a drill string is provided. The method of certain embodiments includes receiving one or more acceleration measurements from a first acceleration sensor in a first portion of the drill string at a first position within a wellbore, the first portion oriented at a first angle relative the wellbore at the first position. The method further includes receiving one or more acceleration measurements from a second acceleration sensor in a second portion of the drill string at a second position within the wellbore, the second portion oriented at a second angle relative to the wellbore at the second position, wherein at least one of the first and second angles is non-zero. The method further includes calculating the difference between the first angle and the second angle in response to the one or more acceleration measurements from the first acceleration sensor and the one or more measurements from the second acceleration sensor.

In certain embodiments, a drilling system is provided which includes a downhole portion adapted to move along a first wellbore, the downhole portion comprising one or more magnetic regions and one or more non-magnetic regions. The drilling system of certain embodiments includes at least two magnetic sensors within at least one non-magnetic region of the downhole portion, the at least two magnetic sensors comprising a first magnetic sensor and a second magnetic sensor spaced apart from one another by a non-zero distance, the first magnetic sensor adapted to generate a first signal in response to magnetic fields of the Earth and of the one or more magnetic regions, the second magnetic sensor adapted to generate a second signal in response to magnetic fields of the Earth and of the one or more magnetic regions. The drilling system can include a controller configured to receive the first signal and the second signal and to calculate the magnetic field of the one or more magnetic regions.

In certain embodiments, a method for generating information indicative of the magnetic field in a first wellbore is provided. The method includes providing a drilling system comprising a downhole portion adapted to move along a first wellbore, the downhole portion comprising one or more magnetic regions and one or more non-magnetic regions. The drilling system of certain embodiments further includes at least two magnetic sensors within at least one non-magnetic region of the downhole portion, the at least two magnetic sensors comprising a first magnetic sensor and a second magnetic sensor spaced apart from one another by a non-zero distance, the first magnetic sensor adapted to generate a first signal in response to magnetic fields of the Earth and of the one or more magnetic regions, the second magnetic sensor adapted to generate a second signal in response to magnetic fields of the Earth and of the one or more magnetic regions. The method further includes generating the first signal and the second signal while the downhole portion of the drilling system is at a first location within the first wellbore and calculating the magnetic field in the first wellbore in response to the first and second signals.

In certain embodiments, a method for determining the magnetic field in a wellbore is provided. The method includes receiving one or more magnetic measurements from at least two magnetic sensors within at least one non-magnetic region of a downhole portion of a drilling system, the at least two magnetic sensors comprising a first magnetic sensor and a second magnetic sensor spaced apart from one another by a non-zero distance, the first magnetic sensor generating a first signal in response to magnetic fields of the Earth and of one or more magnetic regions of the downhole portion, the second magnetic sensor generating a second signal in response to magnetic fields of the Earth and of the one or more magnetic regions. The method of certain embodiments further includes calculating the magnetic field in response to the one or more magnetic measurements from the at least two magnetic sensors.

DETAILED DESCRIPTION

Figure 1:
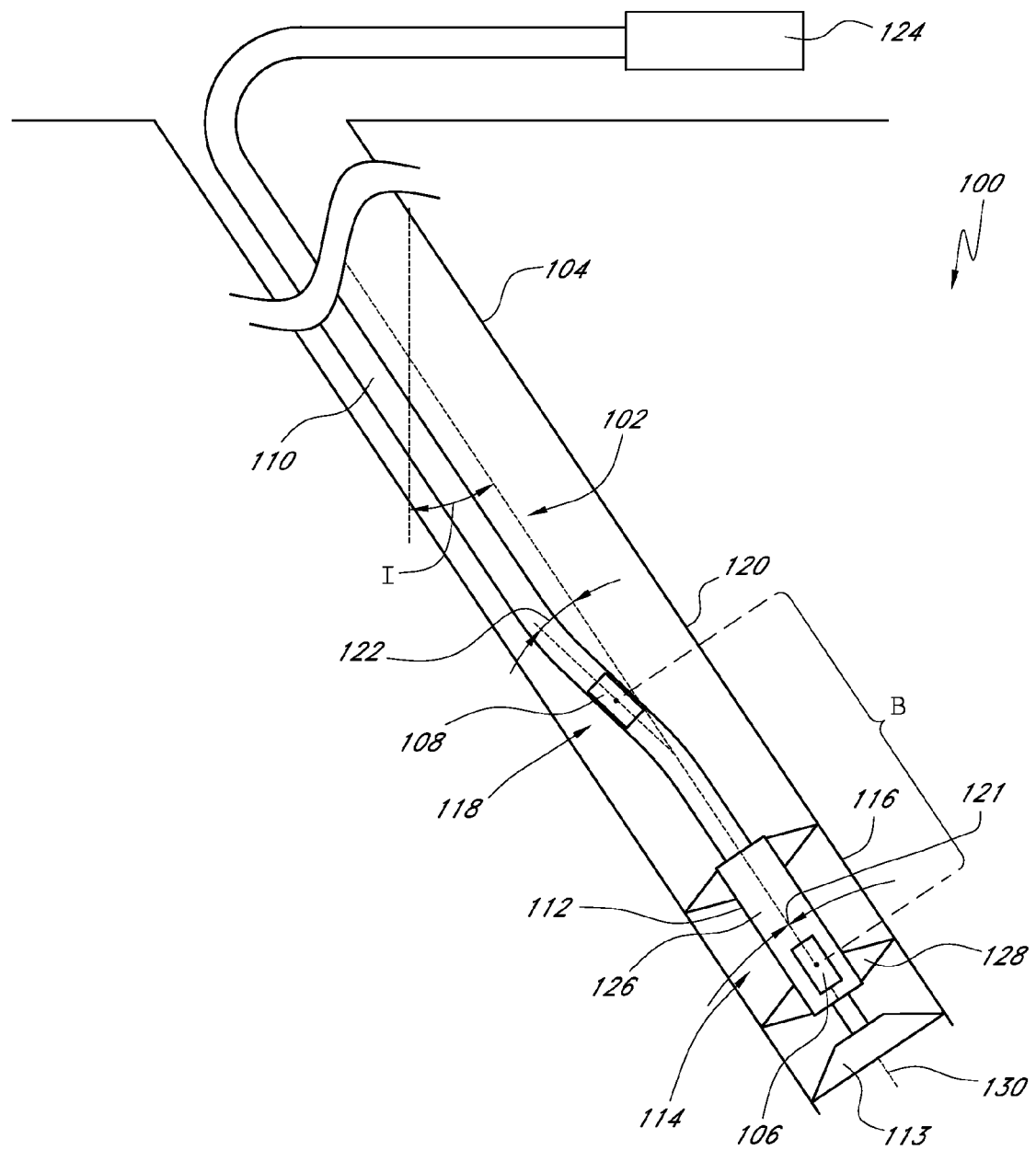
FIG. 1 schematically illustrates an example drill string for use in a wellbore and having first and second acceleration sensors that are misaligned in accordance with certain embodiments described herein.

Certain embodiments described herein provide a downhole-based system for utilizing measurements from multiple sensors on a drilling tool within a wellbore to correct for measurement errors and so allow the trajectory of the well to be determined with greater accuracy than could be achieved using a single set of sensors. The application of multiple sensors also facilitates the determination of the position of the wellbore in relation to another wellbore. In certain embodiments, the system is generally used in logging and drilling applications.

In certain embodiments described herein, measurements from multiple sensors on a drill string provide improved measurement accuracy. For example, certain embodiments described herein correct for external sensor errors utilizing multiple sensors. Sensors may be included in, for example, a measurement while drilling (MWD) instrumentation pack. Additional sensors may be located on a rotary steerable tool in accordance with certain embodiments described herein, and can provide enhanced accuracy of, for example, the measurement of the direction in which the well is progressing and can provide more immediate information regarding changes in well direction. Certain embodiments described herein disclose a drill string including a MWD survey instrument and a rotary steerable tool, where both the MWD survey instrument and the rotary steerable tool include acceleration sensors, magnetic field sensors, or both.

A measurement of a quantity ($x_M$) may be expressed as the sum of the true value of that quantity (x) summed with a disturbance error term ($\epsilon$), where the error may be a function of the well path, its attitude or its heading at the measurement location, and the position of the sensing means with respect to a source of disturbance ($d_D$). For example, $d_D$ may be the position of a magnetic field sensor with respect to a local magnetic disturbance field that may distort the components of the Earth's magnetic field which the magnetic field sensor is configured to measure.

$$x_{M1} = x + \epsilon_1(I, A, d_{D1}, \ldots); \quad \text{(Eq. 1)}$$

where $x_{M1}$ is magnetic field measured by a first magnetic field sensor, x is the magnetic field of the Earth at the location of the first magnetic field sensor, and $\epsilon_1$ is the disturbance error which can be a function of tool azimuth angle (A), inclination (I), and the distance ($d_{D1}$) of the magnetic sensor from a local magnetic disturbance field.

A second measurement of the quantity ($x_M$) at another location along the tool string may be expressed as:

$$x_{M2} = x + \epsilon_2(I, A, d_{D2}, \ldots). \quad \text{(Eq. 2)}$$

where $x_{M2}$ is magnetic field measured by a second magnetic field sensor, x is the magnetic field of the Earth at the second magnetic field sensor location, and $\epsilon_2$ is the disturbance error which can also be a function of azimuth (A), inclination (I) and the distance ($d_{D2}$) of the magnetic sensor with respect to a local magnetic disturbance field.

Taking the difference between the two measurements yields:

$$\Delta x_M = x_{M1} - x_{M2} = \epsilon_1(I, A, d_{D1}, \ldots) - \epsilon_2(I, A, d_{D2}, \ldots). \quad \text{(Eq. 3)}$$

Thus, where the parameters affecting error terms are known, the measurements may be generally used to estimate and correct for the error. Certain embodiments described herein make use of measurements from multiple acceleration sensors, multiple magnetic field sensors, or both to correct for measurement errors. For example, acceleration sensors mounted on the downhole portion of a drill string can be used to determine the inclination of the drill string. According to certain embodiments described herein, the use of measurements from multiple acceleration sensors may be used to determine inclination measurement errors owing to the misalignment of the corresponding portions of the drill string in which the sensors are mounted.

In certain embodiments, magnetic sensors included in a drill string can provide measurements of the orientation of a downhole portion of the drill string with respect to the magnetic field of the Earth. However, magnetized portions of the drill string can interfere with the orientation measurements causing measurement errors. In certain embodiments disclosed herein, data from multiple magnetic sensors may be used to determine the amount of magnetic interference caused by the magnetized portions of the drill string. In certain embodiments, the magnetic sensors may also be used to determine the proximity of the drill string or a portion of the drill string to an existing well.

Figure 2:
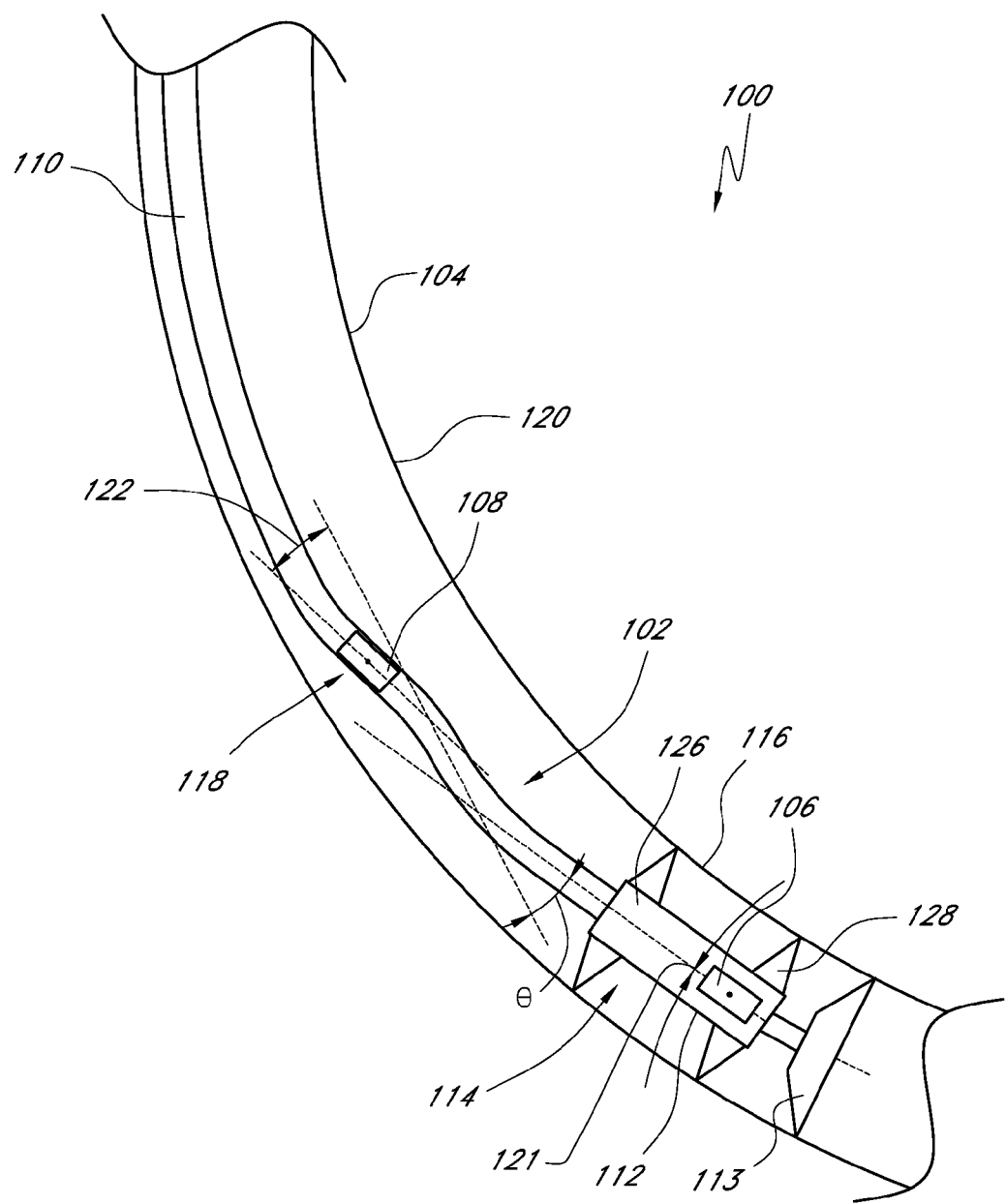
FIG. 2 schematically illustrates an example drill string for use in a wellbore and having first and second acceleration sensors that are misaligned and where the drill string is in a portion of the wellbore having a curvature in accordance with certain embodiments described herein.

A. Comparison of Multiple Acceleration Measurements to Determine Sensor Misalignment FIG. 1 and FIG. 2 schematically illustrate an example downhole portion 102 of a drill string 100 within a wellbore 104 having a first acceleration sensor 106 and a second acceleration sensor 108 that are misaligned relative to one another. In FIG. 1, the downhole portion 102 is in a generally straight section of the wellbore 104, and in FIG. 2, the downhole portion 102 is in a curved or angled section of the wellbore 104. In certain embodiments, the drill string 100 may include an elongate portion 110, comprising sections of drill pipe and drill collars, and a rotary steerable tool 112. In certain embodiments, the drill string comprises a downhole portion 102 adapted to move within the wellbore 104. In certain embodiments, the downhole portion 102 includes a first portion 114 at a first position 116 within the wellbore 104. In certain embodiments, the first portion 114 of the downhole portion 102 is oriented at a first angle 121 relative to the wellbore 104 at the first position 116. The downhole portion 102 may further comprise a second portion 118 at a second position 120 within the wellbore 104 and oriented at a second angle 122 relative to the wellbore 104 at the second position 120. At least one of the first angle 121 and the second angle 122 is non-zero.

The drill string 100 may, in certain embodiments, be a measurement-while-drilling string. In certain embodiments, the drill string 100 can include a MWD instrumentation pack. In certain embodiments, the first acceleration sensor 106 is mounted within the first portion 114 (e.g., on the rotary steerable tool 112) and is adapted to generate a first signal indicative of the specific force acceleration to which the first acceleration sensor 106 is subjected. In certain embodiments, the second acceleration sensor 108 is mounted within the second portion 118 (e.g., on the elongate portion 110 of the drill string 100) and is adapted to generate a second signal indicative of the specific force acceleration sensed by the second acceleration sensor 108. In certain other embodiments, the first and second acceleration sensors 106, 108 may be mounted on the downhole portion 102 in other configurations compatible with embodiments described herein. For example, in some embodiments, both of the first and second acceleration sensors 106, 108 are mounted on the elongate portion 110 (e.g., in two MWD instrumentation packs spaced apart from one another or alongside one another). In other embodiments, both of the first and second acceleration sensors 106, 108 are mounted on the rotary steerable tool 112. In certain embodiments, one or more additional sensors (not shown) are located near the first sensor 106, the second sensor 108, or both. For example, in some embodiments, a third sensor is located near the first sensor 106 and a fourth sensor is located near the second sensor 108. In such an example, the fourth sensor may be mounted in a separate MWD pack located alongside the MWD pack on which the second sensor 108 is mounted.

In certain embodiments, the second position 120 can be spaced from the first position 116 by a non-zero distance B along the axis 130. In certain embodiments, the distance B is about 40 feet. The distance B in certain other embodiments is about 70 feet. In certain embodiments, the second position 120 and the first position 116 are spaced apart from one another by a distance B in a range between about 40 feet to about 70 feet. Other values of B are also compatible with certain embodiments described herein. In certain embodiments, the drill string 100 or the logging string includes a sufficient number of sensors and adequate spacings between the first acceleration sensor 106 and the second acceleration sensor 108 to perform the methods described herein.

In certain embodiments, the rotary steerable tool 112 comprises a housing 126 containing at least one of the acceleration sensors 106, 108. As schematically illustrated by FIG. 1, the housing 126 of certain embodiments contains the first acceleration sensor 106 while the second acceleration sensor 108 is attached on or within the elongate portion 110. The rotary steerable tool 112 of certain embodiments further comprises a drill bit 113 providing a drilling function. In certain embodiments, the downhole portion 102 further comprises portions such as collars or extensions 128, which contact an inner surface of the wellbore 104 to position the housing 126 substantially collinearly with the wellbore 104. In certain embodiments, the drill bit 113 of the rotary steerable tool 112 is adapted to change direction, thereby creating a curvature in the wellbore 104 (FIG. 2) as the rotary steerable tool 112 advances. Examples of such rotary steerable tools 112 are described in UK Patent Application Publication No. GB2172324, entitled "Drilling Apparatus," and UK Patent Application Publication No. GB2177738, entitled "Control of Drilling Courses in the Drilling of Bore Holes," each of which is incorporated in its entirety by reference herein.

In certain embodiments, the first acceleration sensor 106 and the second acceleration sensor 108 comprise accelerometers currently used in conventional wellbore survey tools. For example, in certain embodiments, one or both of the first and second acceleration sensors 106, 108 comprise one or more cross-axial accelerometers that can be used to provide measurements for the determination of the inclination, the high-side tool face angle, or both, of the downhole instrumentation at intervals along the well path trajectory. In certain embodiments, one or both of the first acceleration sensor 106 and the second acceleration sensor 108 comprise multiple (e.g., 2 or 3) single-axis accelerometers, each of which is sensitive to accelerations along a single sensing direction. In certain such embodiments, one single-axis accelerometer of the multiple single-axis accelerometers is advantageously mounted so that its sensing direction is substantially parallel with the axis 130 of the downhole portion 102. In certain embodiments, one or both of the first acceleration sensor 106 and the second acceleration sensor 108 comprise an accelerometer sensitive to accelerations in multiple directions (e.g., a multiple-axis accelerometer). For example, a three-axis acceleration sensor can be used which is capable of measuring accelerations along the axis 130 of the downhole portion 102 and in two generally orthogonal directions in a plane (e.g., a cross-axial plane) that is generally perpendicular to the axis of the downhole portion 102. In certain embodiments, the x and y axes of the three-axis accelerometer sensor are defined to lie in the cross-axial plane while the z axis of the three-axis accelerometer sensor is coincident with the axis of the wellbore 104 or the downhole portion 102. In certain such embodiments, the multiple-axis accelerometer is advantageously mounted so that it is sensitive to accelerations along at least one direction parallel to the axis 130 of the downhole portion 102.

In certain embodiments, the first acceleration sensor 106 and the second acceleration sensor 108 are substantially identical. Example accelerometers include, but are not limited to, quartz flexure suspension accelerometers available from a variety of vendors. Other types of acceleration sensors are also compatible with certain embodiments described herein. In certain embodiments, more than two acceleration sensors may be included in the drill string 100. The first acceleration sensor 106 is also referred to as the "lower acceleration sensor" and the second acceleration sensor 108 is also referred to as the "upper acceleration sensor" herein. The terms "upper" and "lower" are used herein merely to distinguish the two acceleration sensors according to their relative positions along the wellbore 104, and are not to be interpreted as limiting.

The drill string 100 in some embodiments includes a controller 124 which can be configured to calculate the difference between the first angle 121 and the second angle 122. In the embodiment schematically illustrated by FIG. 1, the controller 124 is at the surface and is coupled to the downhole portion 102 by the elongate portion 110. In certain embodiments, the controller 124 comprises a microprocessor adapted to perform the method described herein for determining the sag misalignment of the tool. In certain embodiments, the controller 124 is further adapted to determine the inclination and highside/toolface angle of the tool or the trajectory of the downhole portion 102 within the wellbore 104. In certain embodiments, the controller 124 further comprises a memory subsystem adapted to store at least a portion of the data obtained from the various sensors. The controller 124 can comprise hardware, software, or a combination of both hardware and software. In certain embodiments, the controller 124 comprises a standard personal computer.

In certain embodiments, at least a portion of the controller 124 is located within the downhole portion 102. In certain other embodiments, at least a portion of the controller 124 is located at the surface and is communicatively coupled to the downhole portion 102 within the wellbore 104. In certain embodiments in which the downhole portion 102 is part of a wellbore drilling system capable of measurement while drilling (MWD) or logging while drilling (LWD), signals from the downhole portion 102 are transmitted by mud pulse telemetry or electromagnetic (EM) telemetry. In certain embodiments where at least a portion of the controller 124 is located at the surface, the controller 124 is coupled to the downhole portion 102 within the wellbore 104 by a wire or cable extending along the elongate portion 110. In certain such embodiments, the elongate portion 110 may comprise signal conduits through which signals are transmitted from the various sensors within the downhole portion 102 to the controller 124. In certain embodiments in which the controller 124 is adapted to generate control signals for the various components of the downhole portion 102, the elongate portion 110 is adapted to transmit the control signals from the controller 124 to the downhole portion 102.

In certain embodiments, the controller 124 is adapted to perform a post-processing analysis of the data obtained from the various sensors of the downhole portion 102. In certain such post-processing embodiments, data is obtained and saved from the various sensors of the drill string 100 as the downhole portion 102 travels within the wellbore 104, and the saved data are later analyzed to determine information regarding the downhole portion 102. The saved data obtained from the various sensors advantageously may include time reference information (e.g., time tagging).

In certain other embodiments, the controller 124 provides a real-time processing analysis of the signals or data obtained from the various sensors of the downhole portion 102. In certain such real-time processing embodiments, data obtained from the various sensors of the downhole portion 102 are analyzed while the downhole portion 102 travels within the wellbore 104. In certain embodiments, at least a portion of the data obtained from the various sensors is saved in memory for analysis by the controller 124. The controller 124 of certain such embodiments comprises sufficient data processing and data storage capacity to perform the real-time analysis.

One or more of the first angle 121 and the second angle 122 may be zero degrees in certain embodiments. For example, as illustrated with respect to FIG. 1 and FIG. 2, the first portion 114 may be oriented at an angle of zero degrees with respect to the wellbore 104 at the first position 106. In certain embodiments, at least one of the first angle 121 and the second angle 122 is non-zero. For example, as schematically illustrated in FIGS. 1 and 2, the second portion 118 may be oriented at a non-zero angle with respect to the wellbore 104 at the second position 108. In various embodiments, one or both of the first angle 121 and the second angle 122 may change during operation of the drill string 100. In certain embodiments, the first angle 121 may be much smaller than angle 122 or the second angle 122 may be much smaller than the first angle 121. The difference between the first angle 121 and the second angle 122 may also be referred to as misalignment or vertical misalignment. In certain embodiments, the difference between the first angle 121 and the second angle 122 is less than about one degree. In certain embodiments, the difference between the first angle 121 and the second angle 122 is less than about 0.6 degrees. Other values of the difference between the first angle 121 and the second angle 122 are compatible with certain embodiments described herein. In certain embodiments, the difference between the first angle 121 and the second angle 122 may be caused by gravity-induced misalignment, commonly referred to as sag, of one part of the drill string 100 relative to another part of the drill string 100. In some embodiments, the misalignment is caused by forces internal to the wellbore 104 such as compression of the drill string 100 within the wellbore 104, or by physical mounting misalignment of one of or both of the first and second sensors 106, 108 on the drill string 100. Other causes of the difference between the first angle 121 and the second angle 122 are also compatible with certain embodiments described herein.

The size of the gravity-induced misalignment, the sag, is generally proportional to the component of gravity perpendicular to the well path in the vertical plane. In general, the inclination error ($\Delta I$) attributable to sag is therefore assumed to be proportional to the sine of inclination (I). Thus, the inclination error of a segment of the drill string 100 can be expressed as:

$$\Delta I = S \cdot \sin I; \tag{Eq. 4}$$

where S is the sag/inclination error that is present at the segment of the drill string 100 when the wellbore 104 is horizontal.

Where there is a lower (first) sensor 106 and an upper (second) sensor 108 mounted on the downhole portion 102 of the drill string 100 such as described with respect to certain embodiments herein, and where the rotary steerable tool 112 is assumed to be supported within the wellbore 104 so that the lower sensor 106 aligned with the wellbore 104 (e.g., the first angle 121 is zero), the sag of the upper sensor 108 can be determined using the following equations:

$$I_{UM} = I_U + S \cdot \sin I_U; \tag{Eq. 5}$$

$$I_{LM} = I_L; \tag{Eq. 6}$$

where $I_U$ and $I_L$ are the true inclinations of the upper sensor 108 and the lower sensor 106 respectively. $I_{UM}$ and $I_{LM}$ are measurements of these quantities obtained using the x, y and z (e.g., along wellbore 104) measurements $G_X$, $G_Y$, $G_Z$ provided by an orthogonal triad of accelerometers mounted at each sensor location. For example, the measured inclination can be calculated using the following equation:

$$I_M = \arctan\left[\frac{\sqrt{G_x^2 + G_y^2}}{G_z}\right]; \tag{Eq. 7}$$

For a tangent well section, where the upper and lower sensors 108, 106 are in alignment:

$$I_U = I_L = I. \tag{Eq. 8}$$

Hence, $$\Delta I_M = I_{UM} - I_{LM} = S \cdot \sin I; \tag{Eq. 9}$$

and an estimate of the horizontal sag may be obtained using:

$$S = \frac{\Delta I_M}{\sin I}. \tag{Eq. 10}$$

In the more general situation in which sag is present at the locations of both the upper sensor 108 and the lower sensor 106, the process outlined above can provide an estimate of the difference in sag between the first and second portions 114, 118 of the downhole portion 102.

FIG. 2 schematically illustrates an example drill string 100 having a first acceleration sensor 106 and a second acceleration sensor 108 that are misaligned and where the drill string is in a portion of the wellbore 104 having a curvature (e.g., a bend or dogleg). The curvature shown in FIG. 2 is such that the direction of the wellbore 104 changes by a non-zero angle θ. Where the drill string 100 is in a portion of the wellbore 104 having the curvature, the measured difference in inclination between the upper and lower sensors 108, 106 comprises an inclination difference indicative of the amount of curvature in addition to any inclination difference due to sag. In certain embodiments, information indicative of well curvature between the upper sensor 108 and the lower sensor 106 can be used to determine an improved calculation of the sag. In order to provide information relating to the amount of curvature or bend, the drill string 100 may in certain embodiments include a bend sensor adapted to generate a third signal indicative of an amount of bend between the wellbore 104 at the first position 116 and the wellbore 104 at the second position 120. In certain embodiments, the controller 124 is further configured to calculate the difference between the first angle 121 and the second angle 122 in response to the first, second, and third signals. Various types of bend sensors are compatible with certain embodiments described herein. For example, the bend sensor may be similar to the bend sensors described in U.S. patent application Ser. No. 11/866,213, entitled "System and Method For Measuring Depth and Velocity of Instrumentation Within a Wellbore Using a Bendable Tool," which is incorporated in its entirety by reference herein. For example, the bend sensor of certain embodiments comprises an optical system comprising a light source and a light detector separated from the light source by a non-zero distance along the wellbore 104. The light source can be configured to direct light towards the light detector such that light impinges upon a first portion of the light detector when the downhole portion 102 is in an unbent state and upon a second portion of the light detector when the downhole portion 102 is in a bent state.

In certain embodiments, the controller 124 may be configured to calculate the amount of bend between the wellbore 104 at the first position 116 and the wellbore 104 at the second position 120 in response to the first and second signals using a predictive filtering technique. The predictive filtering technique, for example, may be a Kalman filtering technique, examples of which described herein. In various embodiments, the filtering technique may be used instead of or in addition to using a bend sensor to calculate the amount of bend.

A calculation of the sag which takes into account the bend, which may be measured by a bend sensor, can be made as follows. As described above:

$$I_{UM} = I_U + S \cdot \sin I_U; \tag{Eq. 11}$$

$$I_{LM} = I_L. \tag{Eq. 12}$$

For a curved wellbore section, $$\Delta I = I_L - I_U = \delta \cdot L; \tag{Eq. 13}$$

where δ is the dogleg curvature (bend) of the wellbore between the upper sensor 108 and the lower sensor 106 and where L is the separation between the upper sensor 108 and the lower sensor 106. Hence, $$\Delta I_M = I_{UM} - I_{LM} = S \cdot \sin I - \delta \cdot L; \tag{Eq. 14}$$

and an estimate of the horizontal sag may now be obtained using:

$$S = \frac{\Delta I_M + \delta \cdot L}{\sin I}. \tag{Eq. 15}$$

Figure 3:
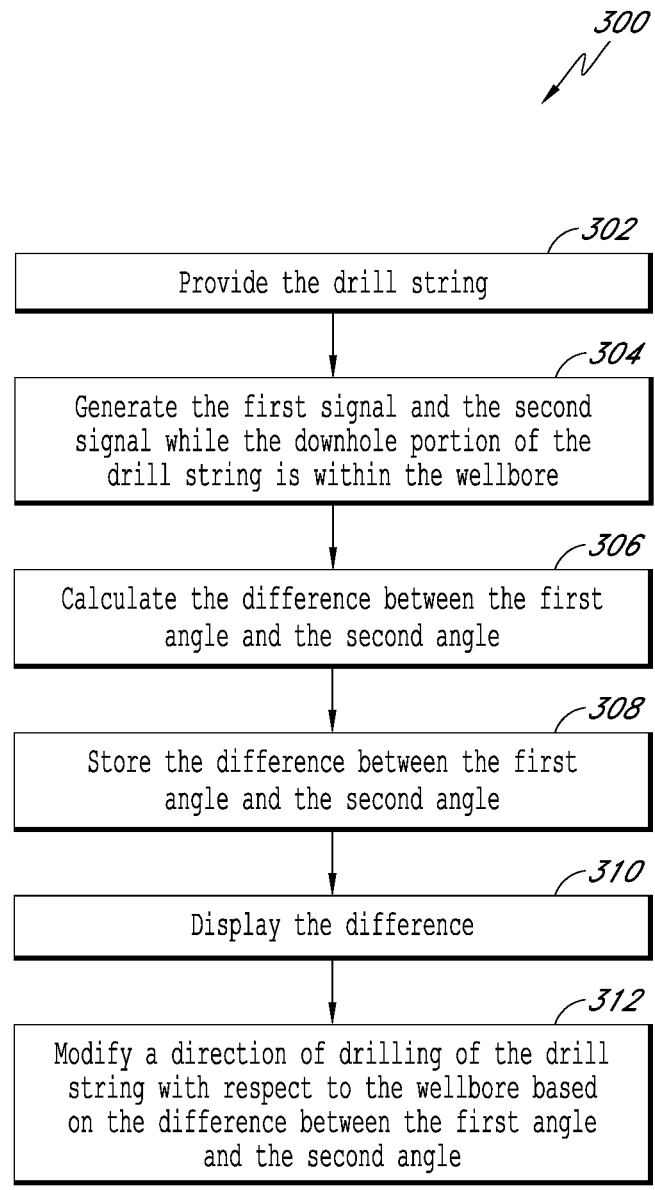
FIG. 3 is a flowchart of an example method of generating information indicative of misalignment between first and second acceleration sensors mounted in the downhole portion of a drill string in accordance with certain embodiments described herein.

FIG. 3 is a flowchart of an example method 300 of generating information indicative of misalignment between the first and second acceleration sensors 106, 108 mounted within the downhole portion 102 of a drill string 100 in accordance with certain embodiments described herein. While the method 300 is described herein by reference to the drill string 100 schematically illustrated by FIG. 1 and by FIG. 2, other drill strings are also compatible with certain embodiments described herein.

In certain embodiments, the method 300 comprises providing a drill string 100 comprising a downhole portion 102 adapted to move within a wellbore 104 in an operational block 302. The downhole portion 102 comprises a first portion 114 at a first position 116 within the wellbore 104 and oriented at a first angle 121 relative to the wellbore 104 at the first position 116. The downhole portion 102 also comprises a second portion 118 at a second position 120 within the wellbore 104 and oriented at a second angle 122 relative to the wellbore 104 at the second position 120 wherein at least one of the first and second angles 121, 122 is non-zero. The drill string 100 further comprises a first acceleration sensor 106 mounted within the first portion 114. The first acceleration sensor 106 is adapted to generate a first signal indicative of an acceleration of the first acceleration sensor 106. The drill string 100 further comprises a second acceleration sensor 108 mounted within the second portion 118, the second acceleration sensor 108 adapted to generate a second signal indicative of an acceleration of the second acceleration sensor 108.

In certain embodiments, the method 300 further comprises generating the first signal and the second signal while the downhole portion 102 of the drill string 100 is within the wellbore 104 in an operational block 304. In certain embodiments, the first and second signals are generated while the downhole portion 102 is moving within the wellbore 104.

In certain embodiments, the method 300 further comprises calculating the difference between the first angle 121 and the second angle 122 in an operational block 306. In certain embodiments, the method 300 comprises storing the difference between the first angle 121 and the second angle 122 in an operational block 308. In certain embodiments, the method 300 further comprises displaying the difference between the first angle 121 and the second angle 122 in an operational block 310. For example, the first and second angles 121, 122 may be displayed on a monitor of a personal computer outside the wellbore 104 at the surface in certain embodiments. In certain embodiments, the method 300 further comprises modifying a direction of drilling of the drill string 100 with respect to the wellbore 104 based on the difference between the first angle 121 and the second angle 122 in an operational block 312. In certain embodiments, the direction can be changed automatically (e.g., by the controller in response to the calculated difference between the first angle 121 and the second angle 122. In certain other embodiments, the direction is changed by a user responding to the displayed difference.

Figure 4:
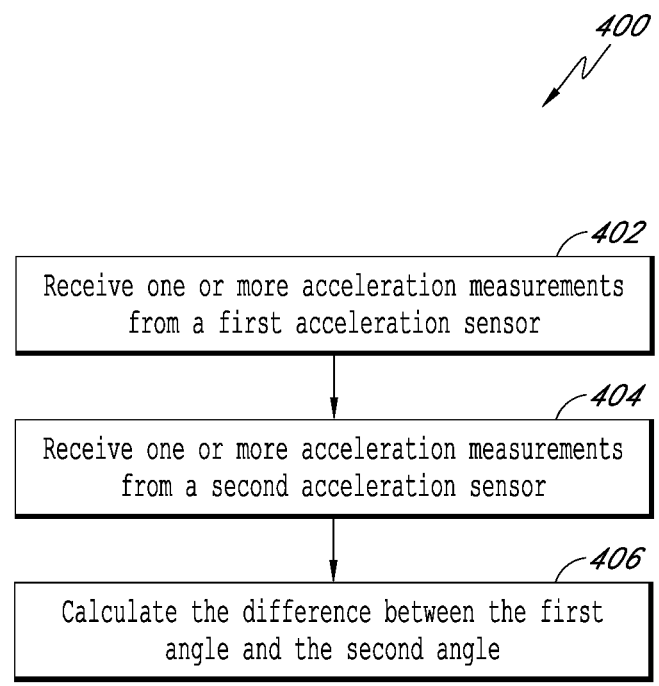
FIG. 4 is a flowchart of an example method of determining the misalignment between first and second acceleration sensors mounted on the downhole portion of a drill string in accordance with certain embodiments described herein.

FIG. 4 is a flowchart of an example method 400 of determining the misalignment between first and second acceleration sensors 106, 108 mounted within a drill string 100 in accordance with certain embodiments described herein. While the method 400 is described herein by reference to the drill string 100 schematically illustrated by FIGS. 1-2, other drill strings are also compatible with certain embodiments described herein.

In certain embodiments, the method 400 comprises receiving one or more acceleration measurements from a first acceleration sensor 106 in a first portion 114 of the drill string 100 at a first position 116 within a wellbore 104 in an operational block 402. The first portion 114 is oriented at a first angle 121 relative the wellbore 104 at the first position 116. In certain embodiments, the method 400 further comprises receiving one or more acceleration measurements from a second acceleration sensor 108 in a second portion 118 of the drill string 100 at a second position 120 within the wellbore 104 in an operational block 404. The second portion 118 is oriented at a second angle 122 relative to the wellbore 104 at the second position 120, wherein at least one of the first and second angles 121, 122 is non-zero.

In certain embodiments, the method 400 further comprises calculating the difference between the first angle 121 and the second angle 122 in response to the one or more acceleration measurements from the first acceleration sensor 106 and the one or more measurements from the second acceleration sensor 108 in the operational block 406. In certain embodiments, the method 400 further comprises storing the difference between the first angle 121 and the second angle 122. The method 400 of certain embodiments further comprises displaying the difference between the first angle 121 and the second angle 122. For example, the first and second angles 121, 122 may be displayed on a monitor of a personal computer outside the wellbore 104 at the surface in certain embodiments. In certain embodiments, the method 400 further comprises modifying a direction of drilling of the drill string 100 with respect to the wellbore 104 based on the difference between the first angle 121 and the second angle 122.

An example calculation method for determining the misalignment between first and second acceleration sensors 106, 108 mounted within a downhole portion 102 of a drill string 100 utilizing a first acceleration sensor 106 and a second acceleration sensor 108 is described herein. While the example method described below utilizes a minimum number of variables, other embodiments are not limited to only these variables.

In the example method described below, the periodicity of the measurements from the two accelerometer sensors define time periods or "epochs" whereby one set of accelerometer measurements are taken at every epoch k. In certain embodiments, the upper and lower sensors 106, 108 may be located in sensor packages which may be mounted on the downhole portion 102 of the wellbore 104. Other embodiments distinguish the two acceleration sensors from one another using other terms.

1. Example Method Utilizing Multiple Measurements to Correct for Misalignment Due to Sag In the example method described below, measurements of well path inclination at the locations of the upper and lower accelerometer sensors 108, 106 in a drill string 100 are compared with estimates of those quantities derived from a mathematical model of the system. In certain embodiments, these quantities are combined in a recursive filtering process which minimizes the variance of errors in the system error model and provide improved estimates of various system characteristics including inclination, dogleg curvature (bend) of the wellbore 104, and sag of the upper and lower sensors 108, 106.

System Model

The example embodiment utilizes a state vector. The state vector $x_k$ at time $t_k$, for epoch k, may be expressed as follows:

$$x_k = [I_k \delta_k S_L S_U]^T;$$ (Eq. 16)

where, $I_k$=the inclination mid-way between the two sensors 106, 108;

$\delta_k$=the average dogleg curvature between the two sensors 106, 108;

$S_L$=horizontal sag for the lower sensor 106; and $S_U$=horizontal sag for the upper sensor 108.

In certain embodiments, $I_k$ and $\delta_k$ are time dependent states while $S_L$ and $S_U$ are independent of time. Inclination predictions from one epoch to the next may be expressed by the equation:

$$I_k I_{k-1} + \Delta D_k \cdot \delta_{k-1};$$ (Eq. 17)

where $\Delta D_k$ is the along-hole depth difference between epochs k−1 and k. The dogleg curvature is assumed to be nominally constant, which is true in certain embodiments described herein. The state covariance matrix at epoch k may be expressed as follows:

$$P_k = \begin{bmatrix} \sigma_{I,k}^2 & \sigma_{I\delta,k} & \sigma_{IS_L,k} & \sigma_{IS_U,k} \\ \sigma_{\delta I,k} & \sigma_{\delta,k}^2 & \sigma_{\delta S_L,k} & \sigma_{\delta S_U,k} \\ \sigma_{S_L I,k} & \sigma_{S_L \delta,k} & \sigma_{S_L,k}^2 & \sigma_{S_L S_U,k} \\ \sigma_{S_U I,k} & \sigma_{S_U \delta,k} & \sigma_{S_U S_L,k} & \sigma_{S_U,k}^2 \end{bmatrix};$$ (Eq. 18)

where $\sigma_{i,k}^2$ is the variance of parameter i in state vector $x_k$, and $\sigma_{ij,k}$ is the covariance between parameters i and j in state vector $x_k$.

Initial values are assigned to the inclination and dogleg states in accordance with the initial inclination measurements taken at the upper sensor 108 and lower sensor 106 locations, $I_{U0}$ and $I_{L0}$ respectively. Hence, the initial state at epoch 0 can be express as follows:

$$x_k = [(I_{L0}+I_{U0})/2 \; (I_{L0}-I_{U0})/L \; 0 \; 0]^T;$$ (Eq. 19)

where L is the fixed distance between the two sensors 106, 108.

The covariance matrix $P_0$ for the initial state at epoch 0 can be expressed as follows:

$$P_0 = \begin{bmatrix} \sigma_I^2 & \sigma_I^2/(B\sqrt{2}) & 0 & 0 \\ \sigma_I^2(B\sqrt{2}) & \sigma_I^2/L^2 & 0 & 0 \\ 0 & 0 & \sigma_{S_L}^2 & 0 \\ 0 & 0 & 0 & \sigma_{S_U}^2 \end{bmatrix};$$ (Eq. 20)

where $\sigma_I$ is the uncertainty in the initial inclination mid-way between the two accelerometer packages, and $\sigma_{S_L}$ and $\sigma_{S_U}$ are the uncertainties in the initial estimates of sag at the sensor locations.

The state vector $x_{k-1}$ at epoch k−1 can be used to predict the state vector $x_k$ at epoch k using the following equation:

$$x_k = \Phi_k \cdot x_{k-1};$$ (Eq. 21)

where $$\Phi_k = \begin{bmatrix} 1 & \Delta D_k & 0 & 0 \\ 0 & 1 & 0 & 0 \\ 0 & 0 & 1 & 0 \\ 0 & 0 & 0 & 1 \end{bmatrix}.$$ (Eq. 22)

The covariance matrix Q for the predicted state vector may be expressed by the following diagonal matrix:

$$Q = \begin{bmatrix} (p_I/\alpha)^2 & 0 & 0 & 0 \\ 0 & (p_\delta/\alpha)^2 & 0 & 0 \\ 0 & 0 & 0 & 0 \\ 0 & 0 & 0 & 0 \end{bmatrix};$$ (Eq. 23)

where $p_I$ is the maximum change in inclination over the measurement update interval and $p_\delta$ is the maximum change in apparent dogleg over the same time period. The elements of the matrix associated with the sag may be set to zero owing to the fact that the horizontal sag for a given tool string will be constant. The parameter α is a multiplication factor between the standard deviation of a state vector element (σ) and the maximum change of the state vector element, such that the maximum change in the state vector element can be expressed as p=α·σ. In certain embodiments, this factor can vary from approximately 2 to approximately 5. In other embodiments, this factor can vary within another range compatible with certain embodiments described herein.

Measurement Equations

Measurements of well path inclination at the upper and lower sensor locations 116, 120 in the drill string 100 may be extracted at regular intervals of time from the respective accelerometer measurements from the upper sensor 108 and the lower sensor 106, as described above. The inclination measurements obtained at epoch k may be expressed as:

$$z_k = \begin{bmatrix} I_{Lk} \\ I_{Uk} \end{bmatrix};$$ (Eq. 24)

where $I_{Lk}$=an inclination measurement derived from the lower acceleration sensor 106 at epoch k; and (Eq. 25)

$I_{Uk}$=an inclination measurement derived from the upper acceleration sensor 108 package at epoch k; (Eq. 26)

Estimates of the inclination at the locations of the upper and lower acceleration sensor 108, 106 at the upper and lower sensor locations 120, 116 may be expressed in terms of the states of the model as follows:

$$\hat{z}_k = \begin{bmatrix} I_k + \delta_K \cdot L/2 + S_L \cdot \sin(I_k + \delta_k \cdot L/2) \\ I_k - \delta_K \cdot L/2 + S_U \cdot \sin(I_k - \delta_K \cdot L/2) \end{bmatrix}.$$ (Eq. 27)

The differences between the inclination measurements and the estimates of these quantities, denoted $\Delta z_k$, can form the inputs to a Kalman filter, where:

$$\Delta z_k = z_k - \hat{z}_k$$ (Eq. 28)
$$= \begin{bmatrix} I_{Lk} - \{I_k + \delta_K \cdot L/2 + S_L \cdot \sin(I_k + \delta_K \cdot L/2)\} \\ I_{Uk} - \{I_k - \delta_K \cdot L/2 + S_U \cdot \sin(I_k - \delta_K \cdot L/2)\} \end{bmatrix}.$$

The measurement differences may be expressed in terms of the system error states, $\Delta x_k = [\Delta I_k \; \Delta \delta_k \; \Delta S_L \; \Delta S_U]^T$, via the following linear matrix equation:

$$\Delta z_k = H_k \cdot \Delta x_k + v_k;$$ (Eq. 29)

where $H_k$ is a 2×4 matrix in which the elements correspond to the partial derivatives of the theoretical measurement equations:

$$H_{11k} = 1 + S_L \cdot \cos(I_k + \delta_k \cdot L/2);$$ (Eq. 30)

$$H_{12k} = \frac{L}{2}\{1 + S_L \cdot \cos(I_k + \delta_k \cdot L/2)\};$$ (Eq. 31)

$$H_{13k} = \sin(I_k + \delta_k \cdot L/2);$$ (Eq. 32)

$$H_{14k} = 0;$$ (Eq. 33)

-continued $$H_{21k} = 1 + S_U \cdot \cos(I_k - \delta_k \cdot L/2); \quad \text{(Eq. 34)}$$

$$H_{22k} = -\frac{L}{2}\{1 + S_U \cdot \cos(I_k - \delta_k \cdot L/2)\}; \quad \text{(Eq. 35)}$$

$$H_{23k} = 0; \quad \text{(Eq. 36)}$$

$$H_{24k} = \sin(I_k - \delta_k \cdot L/2); \quad \text{(Eq. 37)}$$

and where $v_k$ represents the noise in the inclination measurements. The covariance of the measurement noise process at epoch k can be expressed by the following diagonal matrix:

$$R_k = \begin{bmatrix} \sigma_{I_L k}^2 & 0 \\ 0 & \sigma_{I_U k}^2 \end{bmatrix}; \quad \text{(Eq. 38)}$$

where $\sigma_{I_k}$ are the uncertainties in the upper and lower inclination measurements, respectively.

Filter Prediction Step

The covariance matrix corresponding to the uncertainty in the predicted state vector may be expressed as follows:

$$P_{k/k-1} = \Phi_{k-1} \cdot P_{k-1/k-1} \cdot \Phi_{k-1}^T + Q_{k-1}; \quad \text{(Eq. 39)}$$

where $P_{k/k-1}$ is the covariance matrix at epoch k predicted at epoch k−1, or the covariance matrix prior to the update which can be determined using the inclination measurements at epoch k. Since the system states may be corrected following each measurement update, a good estimate of the state error following each measurement update can be zero. The predicted error state can also be zero in certain embodiments.

Filter Measurement Update

The covariance matrix and the state vector can, in certain embodiments, be updated following a measurement at epoch k using the following equations:

$$P_{k/k} = P_{k/k-1} - G_k \cdot H_k \cdot P_{k/k-1}; \quad \text{(Eq. 40)}$$

$$x_{k/k} = x_{k/k-1} + G_k \cdot \Delta z_k; \quad \text{(Eq. 41)}$$

where $P_{k/k}$ is the covariance matrix following the measurement update at epoch k, $x_{k/k-1}$ is the predicted state vector and $x_{k/k}$ is the state vector following the measurement update.

The gain matrix $G_k$ can be expressed as:

$$G_k = P_{k/k-1} \cdot H_k^T [H_k \cdot P_{k/k-1} \cdot H_k^T + R_k]^{-1}. \quad \text{(Eq. 42)}$$

Figure 5:
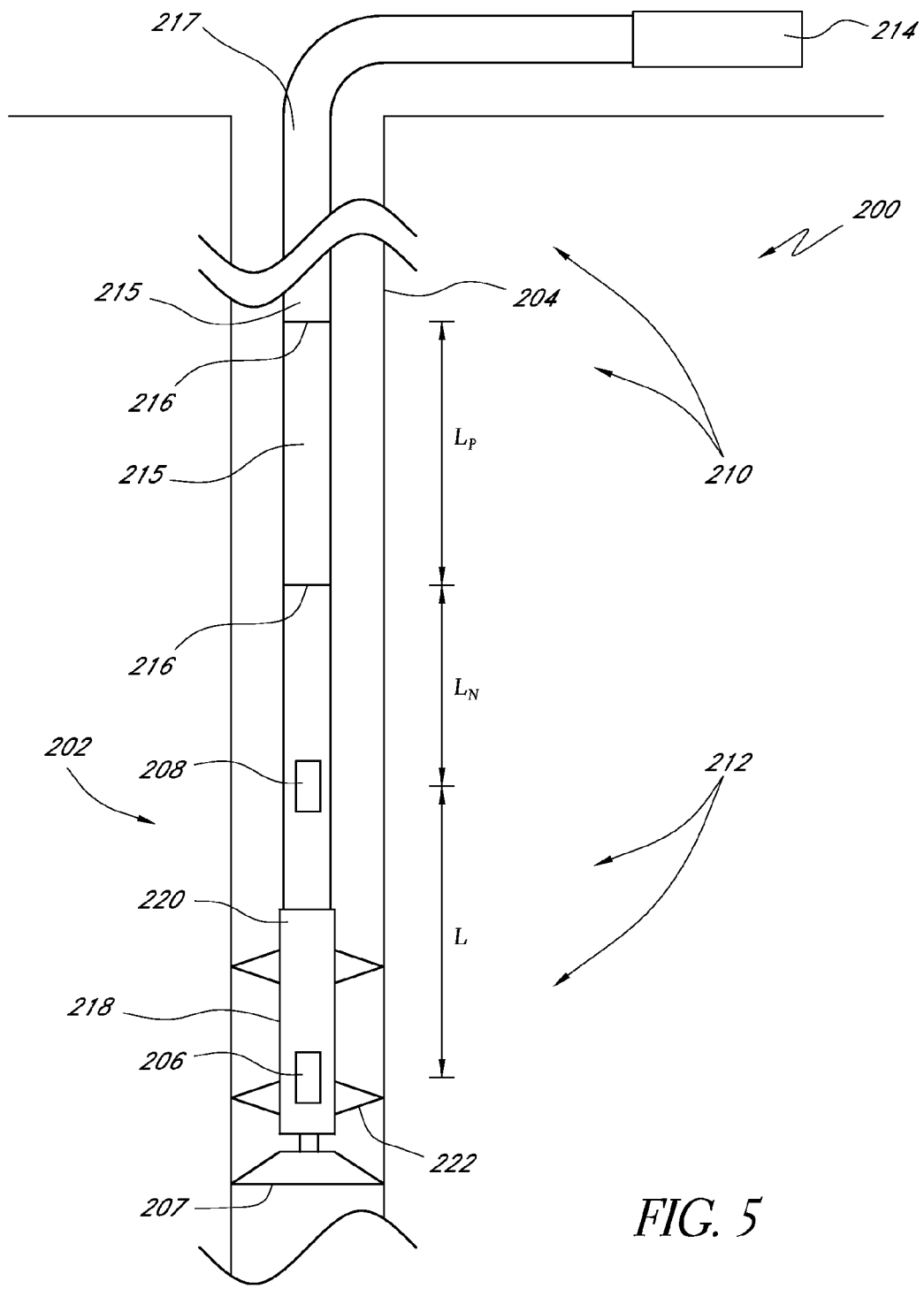
FIG. 5 schematically illustrates an example drilling system including a downhole portion moving along a first wellbore and including at least two magnetic sensors in accordance with certain embodiments described herein.

B. The Use of Multiple Magnetic Field Measurements to Determine Magnetic Interference A drilling system 200 of certain embodiments comprises magnetic components, such as ferromagnetic materials. The magnetic components can be magnetized by one or more magnetic fields, such as, for example, the magnetic field of the Earth. In certain cases, some residual magnetization will remain even after attempts to de-magnetize these components of the drilling system 200. FIG. 5 schematically illustrates an example drilling system 200 including a downhole portion 202 comprising one or more magnetic regions 210 and one or more non-magnetic regions 212. The downhole portion 202 moves along a first wellbore 204. The drilling system 200 of certain embodiments further comprises at least two magnetic sensors 206, 208 within at least one non-magnetic region 212 of the downhole portion 202. The at least two magnetic sensors 206, 208 comprise a first magnetic sensor 206 and a second magnetic sensor 208 spaced apart from one another by a non-zero distance L. In certain embodiments, the first magnetic sensor 206 is adapted to generate a first signal in response to magnetic fields of the Earth and of the one or more magnetic regions 210 of the tool string. The second magnetic sensor 208 is adapted to generate a second signal in response to magnetic fields of the Earth and of the one or more magnetic regions 210 of the tool string.

The downhole portion 202 of certain embodiments comprises a drill string. The downhole portion 202 may include a measurement-while-drilling string, for example. In certain embodiments, the drilling system 200 can include a MWD instrumentation pack. In certain embodiments, one or more of the first and second magnetic sensors 206, 208 is located within or mounted on the MWD instrumentation pack which may be mounted on an elongate portion 217 of the drill string. In certain embodiments, one or more of the first and second magnetic sensors 206, 208 is mounted on a rotary steerable tool 218. For example, in the illustrated embodiment, the first magnetic sensor 206 is mounted on rotary steerable tool 218 and the second magnetic sensor 208 is mounted on the elongate portion 217 of the drill string. In certain other embodiments, the first and second magnetic sensors 206, 208 may be mounted on the downhole portion 202 in various configurations compatible with embodiments described herein. For example, in some embodiments, both of the first and second magnetic sensors 206, 208 are mounted on the elongate portion 217 (e.g., in two MWD instrumentation packs spaced from one another or alongside one another). In other embodiments, both of the first and second magnetic sensors 206, 208 are mounted on the rotary steerable tool 218. In certain embodiments, the drilling system 200 includes a sufficient number of sensors and adequate spacings between the first magnetic sensor 206 and the second magnetic sensor 208 to perform the methods described herein.

In certain embodiments, the rotary steerable tool 218 comprises a housing 220 containing at least one of the magnetic sensors 206, 208. As schematically illustrated by FIG. 5, the housing 220 of certain embodiments contains the first magnetic sensor 206 while the second magnetic sensor 208 is attached on or within the elongate portion 217. The rotary steerable tool 218 of certain embodiments further comprises a drill bit 207. In certain embodiments, the downhole portion 202 is substantially collinear with the wellbore 204.

In certain embodiments, the first and second magnetic sensors 206, 208 may comprise an orthogonal triad of magnetometers which detect the magnetic field in the x, y, and z directions. In certain embodiments, the axial interference can be detected by the z-magnetometer while the cross-axial interference can be detected by the x and y magnetometers. The magnetometers may be of various types including flux gate sensors, solid state devices, or some other type of magnetometer. In certain embodiments, the first and second magnetic sensors 206, 208 are spaced apart from one another by a distance L. In some embodiments, the distance L is about 40 feet. The distance L in certain other embodiments is about 70 feet. In certain embodiments, the second magnetic sensor 208 and the first magnetic sensor 206 are spaced apart from one another by a distance L in a range between about 40 feet to about 70 feet. In other embodiments the distance L is another value compatible with certain embodiments described. In certain embodiments, more than two magnetic sensors may be included in the drill string 100. The first magnetic sensor 206 is also referred to as the "lower magnetic sensor" and the second magnetic sensor 208 is also referred to as the "upper magnetic sensor" herein. The terms "upper" and "lower" are used herein merely to distinguish the two magnetic sensors 206, 208 according to their relative positions along the wellbore 204, and are not to be interpreted as limiting.

The drilling system 200 of certain embodiments further comprises a controller 214 configured to receive the first signal and the second signal and to calculate the magnetic field of the one or more magnetic regions 210. In the embodiment schematically illustrated by FIG. 5, the controller 214 is at the surface and is coupled to the downhole portion 202 by the elongate portion 217. In certain embodiments, the controller 214 comprises a microprocessor adapted to determine an estimate of magnetic interference from the drill string and corrected magnetic interference measurements which can be used to determine tool azimuth with respect to magnetic north. In certain embodiments, the controller 214 further comprises a memory subsystem adapted to store at least a portion of the data obtained from the various sensors. The controller 214 can comprise hardware, software, or a combination of both hardware and software. In certain embodiments, the controller 214 comprises a standard personal computer.

In certain embodiments, at least a portion of the controller 214 is located within the downhole portion 202. In certain other embodiments, at least a portion of the controller 214 is located outside the wellbore 104 at the surface and is communicatively coupled to the downhole portion 202 within the wellbore 204. In certain embodiments in which the downhole portion 202 is part of a wellbore drilling system capable of measurement while drilling (MWD) or logging while drilling (LWD), signals from the downhole portion 202 are transmitted by mud pulse telemetry or electromagnetic (EM) telemetry. In embodiments where at least a portion of the controller 214 is located outside the wellbore 104 at the surface, the controller 214 is communicatively coupled to the downhole portion 202 within the wellbore 204 by a wire or cable of the elongate portion 217. In certain such embodiments, the elongate portion 217 comprises signal conduits through which signals are transmitted from the various sensors within the downhole portion 202 to the controller 214. In certain embodiments in which the controller 214 is adapted to generate control signals for the various components of the downhole portion 202, the elongate portion 217 is adapted to transmit the control signals from the controller 214 to the downhole portion 202.

In certain embodiments, the controller 214 is adapted to perform a post-processing analysis of the data obtained from the various sensors of the downhole portion 202. In certain such post-processing embodiments, data is obtained and saved from the various sensors of the drilling system 200 as the downhole portion 202 travels within the wellbore 204, and the saved data are later analyzed to determine information regarding the downhole portion 202. The saved data obtained from the various sensors advantageously may include time reference information (e.g., time tagging).

In certain other embodiments, the controller 214 provides a real-time processing analysis of the signals or data obtained from the various sensors of the downhole portion 202. In certain such real-time processing embodiments, data obtained from the various sensors of the downhole portion 202 are analyzed while the downhole portion 202 travels within the wellbore 204. In certain embodiments, at least a portion of the data obtained from the various sensors is saved in memory for analysis by the controller 214. The controller 214 of certain such embodiments comprises sufficient data processing and data storage capacity to perform the real-time analysis.

In certain embodiments, the controller 214 is configured to calculate an axial interference and hence to calculate an improved estimate of an azimuthal orientation of the downhole portion 202 with respect to the magnetic field of the Earth. In addition, and as described herein with respect to FIG. 6, the controller 214 of certain embodiments is further configured to calculate an estimate of a relative location of a second wellbore 230 spaced from the first wellbore 204.

In certain embodiments, the one or more non-magnetic regions 212 are not completely non-magnetic. For example, in some embodiments, the non-magnetic regions 212 are less magnetic relative to the magnetic regions 210 but may have some magnetic field associated with them. The non-magnetic regions 212 of certain embodiments comprise non-magnetic drill collars ("NMDCs").

In certain embodiments, the downhole portion 202 of the drill string includes one or more collars 215 and the magnetic regions 210 of the downhole portion 202 comprise two generally equal magnetic poles with opposite signs located near the ends 216 of the collars 215. The magnetic regions 210 of certain embodiments generally comprise axial components which are due to the magnetic poles and are substantially aligned with the wellbore 204 in the direction of drilling. Because the poles of certain embodiments may not be precisely aligned with respect to the drill string axis, cross-axial components may also be present. However, because the misalignment of the poles may generally be relatively small in comparison to the axial distance between the poles and the first and second magnetic sensors 206, 208, the cross-axial components are generally small in comparison to the axial components. The axial and/or cross-axial components of certain embodiments can interfere with measurements of the azimuthal orientation of the downhole portion with respect to the magnetic field of the Earth.

In general, the magnetic regions (e.g., drill pipes or collars) nearest the magnetic sensors 206, 208 can exhibit a significant effect on the magnetic measurements. The axial field strength at the magnetic sensors ($dB_a$) caused by the closest magnetic collar 215 can be given by:

$$dB_a = \frac{P_D}{4\pi} \cdot \left( \frac{1}{L_N^2} - \frac{1}{(L_N + L_P)^2} \right); \quad \text{(Eq. 43)}$$

where $P_D$ is the magnetic pole strength of the drill pipe, $L_P$ is distance between complementary poles (usually the length of a single drill pipe or collar) and $L_N$ is the length of the NMDC between the magnetic sensors and the nearest magnetic pole.

An axial field strength at the magnetic sensors resulting from the effects of the magnetic drill pipes and collars 215 further up the drill string can be given by the following approximate equation:

$$dB_a \approx \frac{P_D}{4\pi \cdot L_N^2}; \quad \text{(Eq. 44)}$$

The magnetic field sensed by a magnetic sensor can be the combined effect of the Earth's magnetic field and the axial drill string magnetization ($dB_a$). The combined field generally may only differ from the Earth's field in the axial (z-axis) direction, and can therefore have the same effect as a z-magnetometer bias. The azimuth error can therefore given by:

$$dA = -\frac{\sin I \cdot \sin A}{B \cdot \cos \theta} \cdot dB_a; \quad \text{(Eq. 45)}$$

where B is the Earth's magnetic field strength, B is the magnetic angle of dip and A is the magnetic azimuth angle.

In a straight section of a wellbore, a measured magnetic azimuth at the upper and lower measurement locations ($A_{UM}$ and $A_{LM}$) (i.e., the locations of the upper and lower magnetic sensors 208, 206) may be expressed in terms of the true azimuth (A) and the axial magnetic interference at the two locations ($dB_{aU}$ and $dB_{aL}$), as follows:

$$A_{UM} = A - \frac{\sin I \cdot \sin A}{B \cdot \cos\theta} \cdot dB_{aU}; \quad (\text{Eq. 46})$$

$$A_{LM} = A - \frac{\sin I \cdot \sin A}{B \cdot \cos\theta} \cdot dB_{aL}; \quad (\text{Eq. 47})$$

where $$dB_{aU} = \frac{P_D}{4\pi \cdot L_N^2}, \quad (\text{Eq. 48})$$

$$dB_{aL} = \frac{P_D}{4\pi \cdot (L+L_N)^2}, \quad (\text{Eq. 49})$$

L is the distance between the two magnetic sensors, and $L_N$ is the length of the non-magnetic section above the upper magnetometer sensor 208. Calculating the difference between the two azimuth measurements yields:

$$\Delta A_M = A_{UM} - A_{LM} = -\frac{\sin I \cdot \sin A}{B \cdot \cos\theta} \cdot \Delta dB; \quad (\text{Eq. 50})$$

where $$\Delta dB = dB_{aU} - dB_{aL} = \frac{P_D}{4\pi} \cdot \left( \frac{1}{L_N^2} - \frac{1}{(L+L_N)^2} \right). \quad (\text{Eq. 51})$$

Hence, the disturbance pole strength may be determined using:

$$P_D = \frac{B \cdot \cos\theta \cdot 4\pi \cdot \Delta A_M}{\sin I \cdot \sin A \cdot \left( \frac{1}{L_N^2} - \frac{1}{(L+L_N)^2} \right)} \quad (\text{Eq. 52})$$

Given knowledge of the axial interference through the example equations outlined above, it is possible to compensate for the interference using embodiments of the disclosure provided herein.

Figure 6:
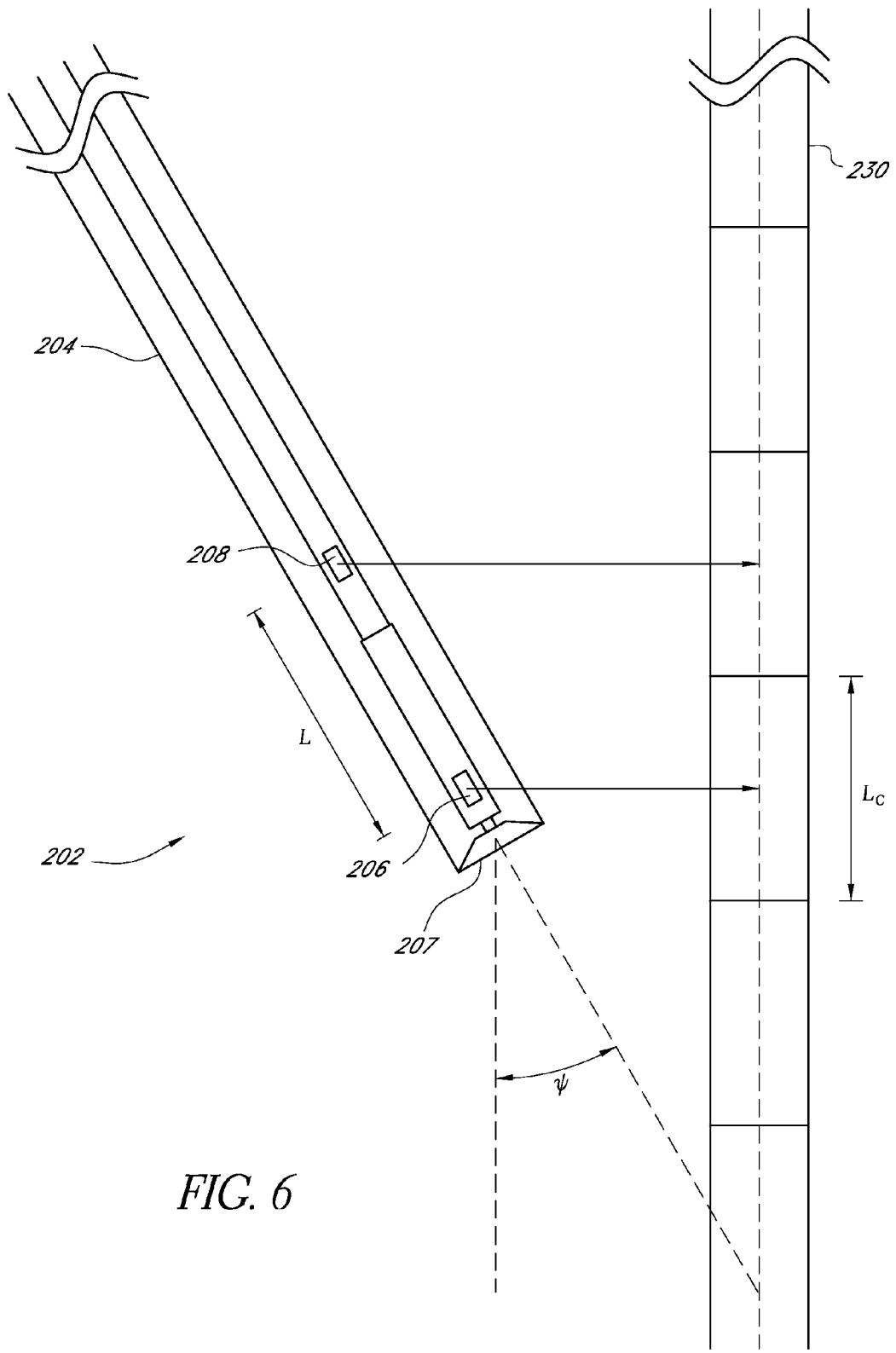
FIG. 6 schematically illustrates the example drilling system of FIG. 5 wherein the downhole portion is moving along a first wellbore and is positioned relative to a second wellbore spaced from the first wellbore in accordance with certain embodiments described herein.

FIG. 6 schematically illustrates a configuration in which the downhole portion 202 of the drilling system 200 is moving along a first wellbore 204 and is positioned relative to a second wellbore 230 spaced from the first wellbore 204. In certain embodiments, the controller 214 is further configured to calculate an estimate of a relative location of the second wellbore 230 spaced from the first wellbore 204. Estimating the location of a second wellbore 230 may be useful to help avoid collisions between, for example, a new wellbore 230 under construction and an existing wellbore 204. The first wellbore 204 may also be described as a new wellbore 104 and the second wellbore 230 may be also described as an existing wellbore 104 throughout the disclosure. The terms new wellbore 104 and existing wellbore 104 are not intended to be limiting.

In addition, detecting the location of the second wellbore 230 may also be beneficial when it is desirable to intercept a second wellbore 230 such as, for example, to drill a relief to intercept the second wellbore 230. In general, as the downhole portion 202 approaches a second wellbore 230, the presence of the second wellbore 230 can be detected using measurements from the first and second magnetic sensors 206, 208 of the drilling system. For example, the first and second sensors 206, 208 may be used to detect the azimuthal orientation of the drilling system 200 with respect to the magnetic field of the Earth. The estimated azimuthal orientation may then be used to steer the drilling system 200. In accordance with certain embodiments described herein, the magnetic field resulting from the magnetized material in the second wellbore 230 (e.g., in the casing string of an existing wellbore) may be detected by the first and second sensors 206, 208 and extracted from measurements indicating the magnetic field of the Earth. These extracted values may then be used to determine the location of the second wellbore 230 in certain embodiments.

Referring to FIG. 6, the angular separation between the two well paths can be denoted by $\psi$. An axial field strength uncertainty at the lower magnetic 206 can be caused by magnetized material in the second wellbore 230 (e.g., in the casing string) and can be given by the following approximate equation:

$$dB_{la} \approx \frac{0.8 L_C}{(4x^2 + L_C^2)^{3/2}} \cdot P_C \cdot \cos\psi + \frac{0.9x}{(4x^2 + L_C^2)^{3/2}} \cdot P_C \cdot \sin\psi; \quad (\text{Eq. 53})$$

The cross-axial interference sensed at the lower magnetic sensor 206 can be given by:

$$dB_{lc} \approx -\frac{0.8 L_C}{(4x^2 + L_C^2)^{3/2}} \cdot P_C \cdot \sin\psi + \frac{0.9x}{(4x^2 + L_C^2)^{3/2}} \cdot P_C \cdot \cos\psi; \quad (\text{Eq. 54})$$

where $P_C$ represents the casing magnetic pole strength, $L_C$ represents the average length of the casing sections, and x represents the separation between the casing string and the lower magnetic sensor 206 in the new wellbore 204.

The upper magnetic sensor 208 in the new wellbore 204 may also be subject to interference from the magnetic portions 210 of the casing in the second wellbore 230. In certain embodiments, the magnetic interference will be lower for the situation shown in FIG. 6 where the new wellbore 230 is approaching the existing wellbore 204 because the upper magnetic sensor is further from the source of magnetic interference (e.g., the casing of the existing wellbore). The axial field strength uncertainty at the upper magnetic sensor 208 caused by casing interference can be given by the following approximate equation:

$$dB_{ua} \approx \frac{0.8 L_C}{(4(x+L \cdot \sin\psi)^2 + L_C^2)^{3/2}} \cdot P_C \cdot \cos\psi + \quad (\text{Eq. 55})$$
$$\frac{0.9(x+L \cdot \sin\psi)}{(4(x+L \cdot \sin\psi)^2 + L_C^2)^{3/2}} \cdot P_C \cdot \sin\psi;$$

while the cross-axial interference at this location can be given by:

$$dB_{uc} \approx -\frac{0.8 L_C}{(4(x+L \cdot \sin\psi)^2 + L_C^2)^{3/2}} \cdot P_C \cdot \sin\psi + \quad (\text{Eq. 56})$$

$$\frac{0.9(x + L \cdot \sin\psi)}{(4(x + L \cdot \sin\psi)^2 + L_C^2)^{3/2}} \cdot P_C \cdot \cos\psi;$$

where L is the separation of the two magnetic instruments along the tool string. Based on these two sets of magnetic readings, four equations having three unknowns (P, x and ψ) may be generated. Therefore, it is possible in certain embodiments to determine the unknown parameters by solving the equations. For example, in one embodiment, a least squares adjustment procedure may be used to compute these values.

Using certain embodiments described herein, the difference between two upper and lower measurements generally increases as the new wellbore 204 approaches the existing wellbore 230. In general, when the new wellbore 204 approaches the existing wellbore 230 along a perpendicular path, the difference in the field measurements between the upper and lower magnetic sensors 208, 206 will be the greatest. As will be appreciated by skilled artisans from the disclosure provided herein, certain embodiments described herein can use the calculated difference in the magnetic fields sensed by the upper and lower magnetic sensors 208, 206 to determine the changing separation distance between the new well 204 and an existing well 230 and to use this information either to avoid a collision between the new well 204 and an existing wellbore 230, or to cause the new well 204 to intercept an existing wellbore 230. For example, where a new wellbore 204 approaches an existing wellbore 230 along a path perpendicular to the existing wellbore 230, the magnetization resulting from the second wellbore 230 and detected by the first and second magnetic sensors 206, 208 in the new wellbore 204 are generally influenced by the same sets of poles in the existing wellbore 230. However, when the new wellbore 204 is approaching the existing wellbore 230 along a non-perpendicular angle, as shown in FIG. 4, the group of magnetic poles from the second wellbore 230 influencing the magnetic field measured by the first magnetic sensor 206 may be different from the group of magnetic poles influencing the magnetic field measured by the second magnetic sensor 208. Whether different sets of magnetic poles are detected by the first and second sensors 206, 208 can depend, for example, on relative separation and can also vary with time as the drilling system 200 moves with respect to the second wellbore 230.

In certain embodiments, the first and second magnetic sensors 206, 208 can also be used during the construction of a new wellbore 204 in close proximity to an existing wellbore 230. For example, when a drilling system 200 in a new wellbore 204 is moving parallel to an existing wellbore, the magnetic field measurements from the first and second magnetic sensors 206, 208 may generally be represented by signals having similar magnitude but varying phase. The relative phase of the two signals can depend, for example, on the spacing between the two magnetic sensors 206, 208 and the length of the casing in the existing well. In certain embodiments, the drilling system 200 can detect a difference between the measurements of the first and second magnetic sensors 206, 208 which indicates that the new wellbore 204 is becoming closer to or is diverging from the existing well 230. In certain embodiments, this indication can be used to direct the drilling system 200 to drill the new wellbore 104 in a direction substantially parallel to the existing wellbore.

Figure 7:
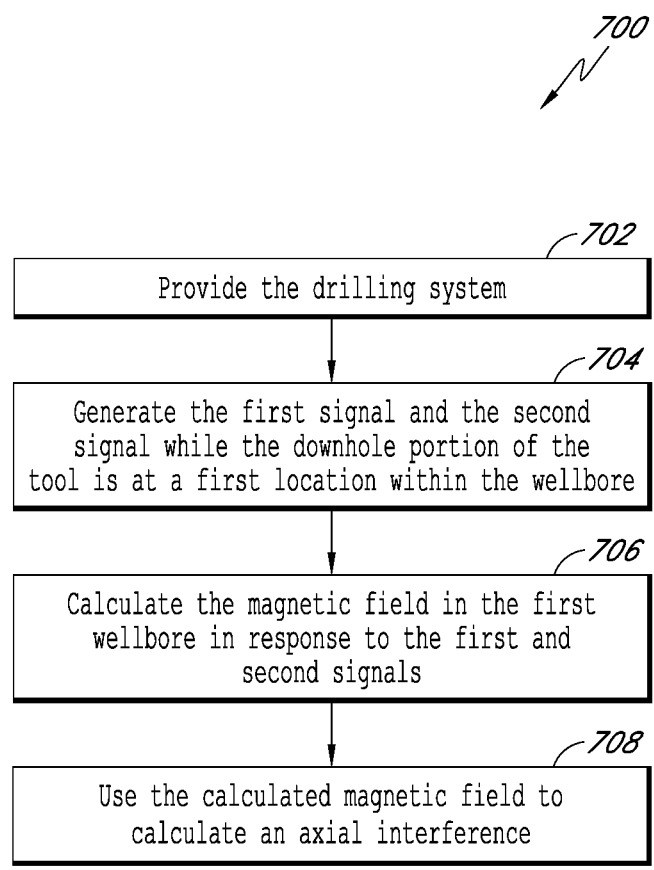
FIG. 7 is a flowchart of an example method of generating information indicative of the magnetic field in a wellbore in accordance with certain embodiments described herein.

FIG. 7 is a flowchart of an example method 700 of generating information indicative of the magnetic field in a first wellbore 204 in accordance with certain embodiments described herein. In certain embodiments, the method 700 comprises providing a drilling system 200 in an operational block 702. The drilling system 200 of some embodiments comprises a downhole portion 202 adapted to move along a first wellbore 204. The downhole portion 202 can include one or more magnetic regions 210 and one or more non-magnetic regions 212. The drilling system 200 further comprises at least two magnetic sensors 206, 208 within at least one non-magnetic region 212 of the downhole portion 202. The at least two magnetic sensors 206, 208 comprise a first magnetic sensor 206 and a second magnetic sensor 208 spaced apart from one another by a non-zero distance L in certain embodiments. The first magnetic sensor 206 in certain embodiments is adapted to generate a first signal in response to magnetic fields of the Earth and of the one or more magnetic regions 210 of the drill string. In some embodiments, the second magnetic sensor 208 is adapted to generate a second signal in response to magnetic fields of the Earth and of the one or more magnetic regions 210 of the drill string.

In an operational block 704, the method 700 of some embodiments further comprises generating the first signal and the second signal while the downhole portion 202 of the drilling system 200 is at a first location within the first wellbore 204. In certain embodiments, the method 700 further includes calculating the magnetic field in the first wellbore 204 in response to the first and second signals in an operational block 706. In certain embodiments, the method 700 further comprises using the calculated magnetic field to calculate an axial interference and hence to calculate an improved estimate of an azimuthal orientation of the downhole portion 202 with respect to the magnetic field of the Earth at operational block 708. The method 700 of some embodiments comprises using the calculated magnetic field to calculate an estimate of a relative location of a second wellbore 230 spaced from the first wellbore 204.

Figure 8:
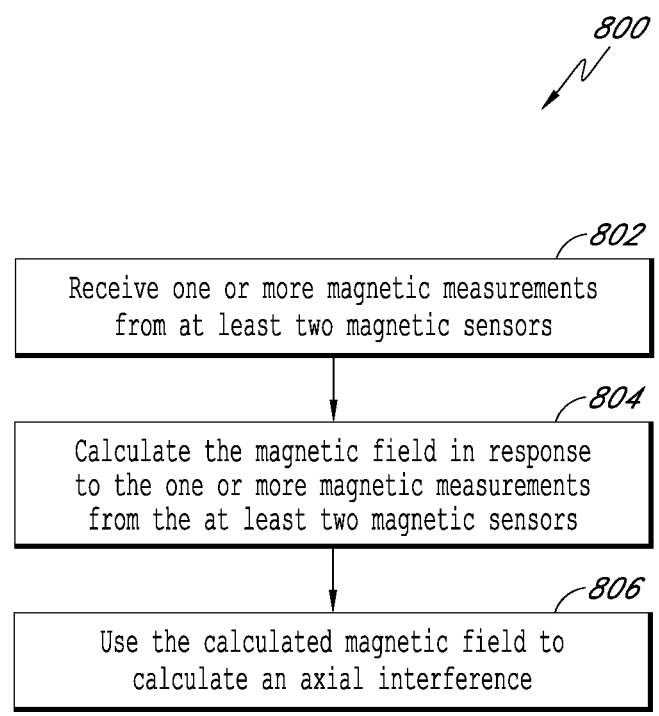
FIG. 8 is a flowchart of an example method of determining the magnetic field in a wellbore in accordance with certain embodiments described herein.

FIG. 8 is a flowchart of an example method 800 for determining the magnetic field in a wellbore 204 in accordance with certain embodiments described herein. In certain embodiments, the method 800 comprises receiving one or more magnetic measurements from at least two magnetic sensors 206, 208 within at least one non-magnetic region 212 of the downhole portion 202 of a drilling system 200 in an operational block 802. In certain embodiments, the at least two magnetic sensors 206, 208 comprise a first magnetic sensor 206 and a second magnetic sensor 208 spaced apart from one another by a non-zero distance L. In certain embodiments, the first magnetic sensor 206 generates a first signal in response to magnetic fields from the Earth and from one or more magnetic regions 210 of the downhole portion 202. In certain embodiments, the second magnetic sensor 208 generates a second signal in response to magnetic fields from the Earth and from the one or more magnetic regions 210.

In an operational block 804, the method 800 of some embodiments further comprises calculating the magnetic field in response to the one or more magnetic measurements from the at least two magnetic sensors 206, 208. In certain embodiments, in an operational block 806, the method 800 further comprises using the calculated magnetic field to calculate an axial interference and hence to calculate an improved estimate of an azimuthal orientation of the downhole portion 202 with respect to the magnetic field of the Earth. In some embodiments, the method 800 further comprises using the calculated magnetic field to calculate an estimate of a relative location of a second wellbore 230 spaced from the wellbore 204.

An example calculation method for determining and correcting for axial magnetization compatible with embodiments of the disclosure is described below. While the example method has a minimum number of variables, other embodiments are not limited to only these variables. Additional variables may also be used, including, but not limited to, velocities and/or depths of the downhole portion of the wellbore 204. In certain embodiments, the units of the parameters and variables below are in meters-kilogram-second (MKS) units.

In the example method described below, the periodicity of the measurements from the two magnetic sensors 206, 208 define time periods or "epochs" whereby one set of magnetic measurements are taken at every epoch k. In certain embodiments, the upper and lower magnetic sensors 208, 206 may be located in sensor packages which may be mounted on the downhole portion 202 of the wellbore 204. Other embodiments distinguish the two magnetic sensors from one another using other terms.

1. Example Method Utilizing Multiple Measurements to Correct for Axial Magnetization In the example method described below, measurement of magnetic azimuth based on measurements from the upper and lower magnetic sensors 208, 206 in a drilling system 200 are compared with estimates of those quantities derived from a mathematical model of the system to provide a determination and correction of axial magnetic interference. In certain embodiments, these quantities are combined in a recursive filtering process which minimizes the variance of errors in the system error model and provide improved estimates of various system characteristics including magnetic azimuth (A) and drill string pole strength ($P_D$).

System Model

A state vector $x_k$ at epoch k, can be expressed as follows:

$$x_k = [A_k P_D]^T;\quad\text{(Eq. 57)}$$

where $A_k$ = magnetic azimuth mid-way between the two magnetic sensors (e.g., two magnetometer packages); and (Eq. 58)

$P_D$ = drill string pole strength. (Eq. 59)

$A_k$ is time dependent while $P_D$ is independent of time. Azimuth doglegs are assumed to be small in the example method and are therefore ignored.

The initial value assigned to the azimuth state may be the mean of the azimuth readings obtained for the upper and lower magnetometer locations, $A_{U0}$ and $A_{L0}$, respectively, assuming any small dogleg curvature that does exist is fixed between these two drill pipe locations. Hence, the initial state at epoch 0 can be given by the following equation:

$$x_k = [(A_{L0}+A_{U0})/2\ 0]^T;\quad\text{(Eq. 60)}$$

The covariance matrix $P_0$ for the initial state at epoch 0 can be expressed as follows:

$$P_0 = \begin{bmatrix} \sigma_A^2 & 0 \\ 0 & \sigma_{P_D}^2 \end{bmatrix};\quad\text{(Eq. 61)}$$

where $\sigma_A$ is the uncertainty in the initial azimuth approximately mid-way between the two magnetic sensors 206, 208 and $\sigma_{P_D}$ is the uncertainty in the initial estimate of the pole strength.

The state vector $x_{k-1}$ at epoch k−1 can be used to predict the state vector $x_k$ at epoch k using the following equation:

$$x_k = x_{k-1};\quad\text{(Eq. 62)}$$

The covariance matrix Q for the predicted state vector can be given by the following diagonal matrix:

$$Q = \begin{bmatrix} (p_A/\alpha)^2 & 0 \\ 0 & 0 \end{bmatrix};\quad\text{(Eq. 63)}$$

where $p_A$ is the maximum change in azimuth over the measurement update interval. The drill-string pole strength can be assumed to be constant and the matrix element associated with this state can therefore be set to zero. The parameter a is a multiplication factor between the standard deviation of a state vector element ($\sigma$) and the maximum change of the state vector element such that the maximum change in the state vector element can be expressed as p=α·σ. In certain embodiments, this factor can vary from approximately 2 to approximately 5 in one embodiment. In other embodiments, this factor can vary within another range compatible with certain embodiments described herein.

Measurement Equations

Measurements of the well path azimuth based on the respective magnetic sensor measurements at the upper and lower locations of the magnetic sensors 206, 208 in the drill string may be extracted at generally regular intervals of time. The inclination measurements obtained at epoch k may be expressed as:

$$z_k = \begin{bmatrix} A_{Lk} \\ A_{Uk} \end{bmatrix};\quad\text{(Eq. 64)}$$

where $A_{Lk}$ = the azimuth measurement derived from the lower magnetometer package at epoch k; (Eq. 65)

$A_{Uk}$ = the azimuth measurement derived from the upper magnetometer package at epoch k; (Eq. 66)

Estimates of the azimuth at the upper and lower magnetometer/accelerometer package locations based on the model may be expressed in terms of the states of the model as follows:

$$\hat{z}_k = \begin{bmatrix} A_k + \sin I_{Lk} \cdot \sin A_k \cdot P_D/(4\cdot\pi\cdot B_H \cdot (L+L_N)^2) \\ A_k + \sin I_{Uk} \cdot \sin A_k \cdot P_D/(4\cdot\pi\cdot B_H \cdot L_N^2) \end{bmatrix};\quad\text{(Eq. 67)}$$

Differences between the azimuth measurements and the estimates of these quantities, denoted $\Delta z_k$, form the inputs to a Kalman filter, where:

$$\Delta z_k = z_k - \hat{z}_k$$
$$= \begin{bmatrix} A_{Lk} - \{A_k + \sin I_{Lk} \cdot \sin A_k \cdot P_D/(4\cdot\pi\cdot B_H \cdot (L+L_N)^2)\} \\ A_{Uk} - \{A_k + \sin I_{Uk} \cdot \sin A_k \cdot P_D/(4\cdot\pi\cdot B_H \cdot L_N^2)\} \end{bmatrix};$$

The measurement differences may be expressed in terms of the system error states, via the following linear matrix equation:

$$\Delta z_k = H_k \cdot \Delta x_k + v_k;\quad\text{(Eq. 68)}$$

where $H_k$ comprises a 2×2 matrix in which the elements correspond to the partial derivatives of the theoretical measurement equations:

$$H_{11k} = 1 + \sin I_{Lk} \cos A_k \cdot P_d/(4\cdot\pi\cdot B_H \cdot (L+L_N)^2);\quad\text{(Eq. 69)}$$

$$H_{12k} = \sin I_{Lk} \cos A_k/(4\cdot\pi\cdot B_H \cdot (L+L_N)^2);\quad\text{(Eq. 70)}$$

$$H_{21k} = 1 + \sin I_{Uk} \cdot \cos A_k \cdot P_D / (4 \cdot \pi \cdot B_H \cdot L_N^2); \text{ and} \quad \text{(Eq. 71)}$$

$$H_{22k} = \sin I_{Uk} \cdot \cos A_k / (4 \cdot \pi \cdot B_H \cdot L_N^2); \quad \text{(Eq. 72)}$$

and where $v_k$ represents noise in the azimuth measurements. The covariance of the measurement noise process at epoch k can be given by the following diagonal matrix:

$$R_k = \begin{bmatrix} \sigma_{A_L k}^2 & 0 \\ 0 & \sigma_{A_U k}^2 \end{bmatrix}; \quad \text{(Eq. 73)}$$

where $\sigma_{A_U k}$ and $\sigma_{A_L k}$ comprise the uncertainties in the upper and lower azimuth measurements, respectively.

In certain embodiments, the above system and measurement equations can be used to implement the filtering process as follows.

Filter Prediction Step

The covariance matrix corresponding to the uncertainty in the predicted state vector can be given by:

$$P_{k/k-1} = P_{k-1/k-1} + Q_{k-1}; \quad \text{(Eq. 74)}$$

Filter Measurement Update

The covariance matrix and the state vector are updated following a measurement at epoch k using the following equations:

$$P_{k/k} = P_{k/k-1} - G_k \cdot H_k \cdot P_{k/k-1}; \quad \text{(Eq. 75)}$$

$$x_{k/k} = x_{k/k-1} + G_k \cdot \Delta z_k; \text{ and} \quad \text{(Eq. 76)}$$

$$G_k = P_{k/k-1} \cdot H_k^T [H_k \cdot P_{k/k-1} \cdot H_k^T + R_k]^{-1}. \quad \text{(Eq. 77)}$$

Certain embodiments described herein provide a measure of the misalignment of multiple acceleration sensors mounted in the downhole portion of a drill string. In certain embodiments, the measure of the misalignment corresponds to a measure of sag which can be used to provide an improved estimate of the inclination of the downhole portion of the drill string and/or the wellbore. In certain embodiments, the measurements are based entirely on the use of down-hole sensors, and are independent of any surface measurement devices which are subject to error in the detection of true down-hole location and movement. In order to provide an improved determination of the trajectory and position of the downhole portion of the drill string, certain embodiments described herein may be used in combination with a system capable of determining the depth, velocity, or both, of the downhole portion. Examples of such systems are described in U.S. Pat. No. 7,350,410, entitled "System and Method for Measurements of Depth and Velocity of Instrumentation Within a Wellbore," and U.S. patent application Ser. No. 11/866,213, entitled "System and Method For Measuring Depth and Velocity of Instrumentation Within a Wellbore Using a Bendable Tool," each of which is incorporated in its entirety by reference herein.

In certain embodiments, a processing algorithm based on a mathematical model of wellbore curvature (dogleg), inclination, and misalignment of sensors mounted in the wellbore is used to provide an improved estimate of the inclination of the downhole portion of a drill string and/or wellbore. The measurements generated by the multiple accelerometers in certain embodiments can be compared with estimates of the same quantities derived from the states of the model. These measurement differences can form the inputs to the processing algorithm which effectively cause the outputs of the model to be driven into coincidence with the measurements, thus correcting the outputs of the model. In certain embodiments, estimates of the misalignment error are based on measurements from each location as the drill string traverses the path of the wellbore. The measurement accuracy in certain such embodiments is enhanced by the use of the independent measurements of well curvature or inclination, obtained in the vicinity of the sensor locations, thereby increasing the accuracy and reliability of the estimation algorithm.

Certain embodiments described herein provide an estimate of the magnetic interference incident upon multiple magnetic sensors mounted within a non-magnetic region of the downhole portion of a drilling system. In certain such embodiments, the interference components result from magnetic fields incident upon the sensors which are not from the magnetic field of the Earth. Certain embodiments utilize the magnetic measurements to determine an axial interference resulting from one or more magnetic portions of the downhole portion and to provide an improved estimate of the azimuthal orientation of the downhole portion with respect to the magnetic field of the Earth. Certain embodiments utilize a processing algorithm based on a mathematical model of magnetic azimuth mid-way between two magnetic sensors and drill string pole strength. The measurements generated by the two magnetic sensors in certain embodiments can be compared with estimates of the same quantities derived from the states of the model. These measurement differences can form the inputs to the processing algorithm which effectively cause the outputs of the model to be driven into coincidence with the measurements, thus correcting the outputs of the model.

In certain embodiments, the magnetic measurements are used to detect magnetic fields from sources other than magnetic regions in the downhole portion of the drill string, such as, for example, from magnetic regions in a second wellbore. In certain such embodiments, the magnetic measurements are used to detect the location of the second wellbore relative to the first wellbore.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A measurement system having a downhole portion configured to move within a wellbore, the downhole portion having a first portion and a second portion, the first portion configured to be oriented at a first angle relative to the wellbore at a first position and the second portion configured to be oriented at a second angle relative to the wellbore at a second position, wherein at least one of the first angle and the second angle is non-zero, the measurement system comprising:
   a first sensor mounted within the first portion, the first sensor configured to generate a first signal indicative of the orientation of the first portion relative to the Earth;
   a second sensor mounted within the second portion, the second sensor configured to generate a second signal indicative of the orientation of the second portion relative to the Earth; and
   a controller configured to receive the first signal and the second signal and to calculate a difference between the first angle and the second angle.

2. The measurement system of claim 1, wherein the orientation of the first portion relative to the Earth comprises a first azimuthal angle and a first inclination angle, and the orientation of the second portion relative to the Earth comprises a second azimuthal angle and a second inclination angle.

3. The measurement system of claim 1, wherein a difference between the first angle and the second angle is due to gravity induced sag and is less than about one degree.

4. The measurement system of claim 1, wherein the first sensor and the second sensor are spaced apart from one another by a distance in a range between about 40 feet to about 70 feet.

5. The measurement system of claim 1, further comprising a bend sensor configured to generate a third signal indicative of an amount of bend between the wellbore at the first position and the wellbore at the second position.

6. The measurement system of claim 5, wherein the controller is further configured to calculate the difference between the first angle and the second angle in response to the first, second, and third signals.

7. The measurement system of claim 5, wherein the bend sensor comprises an optical system comprising a light source and a light detector separated from the light source by a non-zero distance along the wellbore, the light source configured to direct light towards the light detector, the light impinging upon a first portion of the light detector when the downhole portion is in an unbent state and upon a second portion of the light detector when the downhole portion is in a bent state.

8. The measurement system of claim 1, wherein the controller is further configured to calculate the amount of bend between the wellbore at the first position and the wellbore at the second position in response to the first and second signals using a predictive filtering technique.

9. The measurement system of claim 8, wherein the predictive filtering technique comprises Kalman filtering.

10. A method of determining the misalignment between a first sensor and a second sensor within a wellbore, the method comprising:
receiving one or more signals from the first sensor indicative of an orientation relative to the Earth of the first sensor at a first position within the wellbore, the first sensor oriented at a first angle relative to the wellbore at the first position;
receiving one or more signals from the second sensor indicative of an orientation relative to the Earth of the second sensor at a second position within the wellbore, the second sensor oriented at a second angle relative to the wellbore at the second position, wherein at least one of the first angle and the second angle is non-zero; and
calculating the difference between the first angle and the second angle in response to the one or more signals from the first sensor and the one or more signals from the second sensor.

11. A measurement system having a downhole portion configured to move within a first wellbore, the downhole portion comprising at least one magnetic region, the measurement system comprising:
a first magnetic sensor and a second magnetic sensor spaced apart from one another by a non-zero distance, the first magnetic sensor configured to generate a first signal in response to magnetic fields of the Earth and of the at least one magnetic region, the second magnetic sensor configured to generate a second signal in response to magnetic fields of the Earth and of the at least one magnetic region; and
a controller configured to receive the first signal and the second signal and to calculate information regarding the magnetic field of the at least one magnetic region.

12. The measurement system of claim 11, wherein the controller is further configured to calculate an estimate of an orientation of the downhole portion with respect to the magnetic field of the Earth corrected for interference from the magnetic field of the at least one magnetic region.

13. The measurement system of claim 11, wherein the controller is further configured to calculate an estimate of a relative location of a second wellbore spaced from the first wellbore.

14. The measurement system of claim 11, wherein the first magnetic sensor and the second magnetic sensor are spaced apart from one another by a distance in a range between about 40 feet to about 70 feet.

* * * * *

UNITED STATES PATENT AND TRADEMARK OFFICE
CERTIFICATE OF CORRECTION

PATENT NO.        : 8,433,519 B2                                    Page 1 of 1
APPLICATION NO.   : 13/308267
DATED             : April 30, 2013
INVENTOR(S)       : Ekseth et al.

It is certified that error appears in the above-identified patent and that said Letters Patent is hereby corrected as shown below:

In the Specification

Column 12 at line 65, Change " $I_k I_{k-1} + \Delta D_k \cdot \delta_{k-1};$ " to -- $I_k = I_{k-1} + \Delta D_k \cdot \delta_{k-1};$ --.

Column 15 at line 20, After " $\sigma_{I_U k}$ " insert --and $\sigma_{I_L k}$ --.

Column 19 at line 1, Change "B" to --θ--.

Column 24 at line 9, Change "a" to --α--.

Column 24 at line 65, Change "$P_d$" to --$P_D$--.

Signed and Sealed this
Twenty-first Day of October, 2014

Michelle K. Lee
*Deputy Director of the United States Patent and Trademark Office*